(12) United States Patent
Yamamoto

(10) Patent No.: US 12,061,106 B2
(45) Date of Patent: Aug. 13, 2024

(54) THERMAL GAS FLOW METER THAT CORRECTS FLUID FLOW BASED ON TENDENCY OF A DETECTED FLOW VALUE DETECTED BY A TEMPERATURE SENSOR

(71) Applicant: OMRON Corporation, Kyoto (JP)

(72) Inventor: Katsuyuki Yamamoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 353 days.

(21) Appl. No.: 17/434,979

(22) PCT Filed: Mar. 4, 2020

(86) PCT No.: PCT/JP2020/009226
§ 371 (c)(1),
(2) Date: Aug. 30, 2021

(87) PCT Pub. No.: WO2020/184344
PCT Pub. Date: Sep. 17, 2020

(65) Prior Publication Data
US 2022/0146296 A1     May 12, 2022

(30) Foreign Application Priority Data

Mar. 14, 2019    (JP) ................. 2019-047694

(51) Int. Cl.
*G01F 15/04*      (2006.01)
*G01F 1/69*      (2006.01)
(Continued)

(52) U.S. Cl.
CPC ............... *G01F 15/04* (2013.01); *G01F 1/69* (2013.01); *G01F 15/06* (2013.01)

(58) Field of Classification Search
CPC . G01F 15/04; G01F 1/69; G01F 15/06; G01F 1/6842; G01F 5/00; G01F 15/046; G01F 1/692; G01N 25/18

See application file for complete search history.

(56) References Cited

U.S. PATENT DOCUMENTS 9,068,871 B2 *   6/2015   Yamamoto ............ G01F 1/688
2004/0098210 A1 *   5/2004   Fujiwara ............ G01F 1/6845
                                                     702/45

(Continued)

FOREIGN PATENT DOCUMENTS

CN        108572017 A     9/2018
CN        109323732 A     2/2019

(Continued)

OTHER PUBLICATIONS

International Search Report issued in Intl. Appln. No. PCT/JP2020/009226 mailed Jun. 23, 2020. English translation provided.

(Continued)

*Primary Examiner* — Peter J Macchiarolo
*Assistant Examiner* — Anthony W Megna Fuentes
(74) *Attorney, Agent, or Firm* — ROSSI, KIMMS & McDOWELL LLP

(57) ABSTRACT

Provided are a heater that heats a fluid, and a temperature detector that detects a temperature of the fluid, and a flow rate of the fluid flowing through a main channel is corrected based on a tendency of a detection value detected by the temperature detector to change over time.

9 Claims, 15 Drawing Sheets

(51) Int. Cl.
*G01F 15/06* (2022.01)
*G01F 1/684* (2006.01)
*G01F 1/692* (2006.01)
*G01F 5/00* (2006.01)
*G01N 25/18* (2006.01)

(56) References Cited

U.S. PATENT DOCUMENTS

| | | |
|---|---|---|
| 2007/0151331 A1 | 7/2007 | Kawanishi |
| 2008/0184775 A1 | 8/2008 | Yamagishi |
| 2014/0069205 A1 | 3/2014 | Yamamoto |
| 2014/0360262 A1* | 12/2014 | Asano ............... G01F 1/6845 73/204.25 |
| 2018/0266863 A1 | 9/2018 | Muramatsu |
| 2019/0033110 A1 | 1/2019 | Yanagawa et al. |
| 2019/0331515 A1* | 10/2019 | Smirnov ............... G01F 25/15 |
| 2020/0049636 A1 | 2/2020 | Motegi |

FOREIGN PATENT DOCUMENTS

| | | |
|---|---|---|
| JP | H11153561 A | 6/1999 |
| JP | 2001235357 A | 8/2001 |
| JP | 2005214856 A | 8/2005 |
| JP | 2007225609 A | 9/2007 |
| JP | 2009288085 A | 12/2009 |
| JP | 2012233776 A | 11/2012 |
| JP | 2018025420 A | 2/2018 |
| WO | 2012147586 A1 | 11/2012 |

OTHER PUBLICATIONS

Written Opinion issued in Intl. Appln. No. PCT/JP2020/009226 mailed Jun. 23, 2020. English translation provided.
Office Action issued in Japanese Appln. No. 2019-047694 mailed Mar. 7, 2023. English machine translation provided.
Office Action issued in Chinese Appln. No. 202080017611.0, mailed Jan. 10, 2024. English translation provided.

* cited by examiner

THERMAL GAS FLOW METER THAT CORRECTS FLUID FLOW BASED ON TENDENCY OF A DETECTED FLOW VALUE DETECTED BY A TEMPERATURE SENSOR

TECHNICAL FIELD

The present invention relates to a flow rate measuring device, a gas meter provided with a flow rate measuring device, and a flow rate measuring device unit provided for a gas meter.

BACKGROUND ART

There has been proposed a measuring device that includes a heater and a sensor and calculates a flow velocity or flow rate of a fluid based on a temperature distribution detected by the sensor that varies in a manner that depends on a flow of the fluid.

There has been further proposed a flow rate measuring device in which a heater and a temperature detector are arranged side by side in a direction orthogonal to a flow direction of a fluid, and a flow rate detector is disposed at a position other than a physical property value detection channel (see, for example, Patent Document 1).

When the above-described flow rate measuring device in the related art is provided with physical property value detectors arranged side by side in the direction orthogonal to the flow direction of the fluid, it is possible to cope with flow rate dependence. When the fluid is similar in composition or type, it may be difficult to reduce the flow rate dependence.

PRIOR ART DOCUMENT

Patent Document

Patent Document 1: Japanese Unexamined Patent Publication No. 2012-233776

SUMMARY OF THE INVENTION

Problems to be Solved by the Invention

The present invention has been made in view of the above-described problems, and it is therefore an object of the present invention to provide a technique for allowing a flow rate measuring device to measure a flow rate with higher accuracy.

Means for Solving the Problem

Provided according to the present invention for solving the above-described problems is a flow rate measuring device that detects a flow rate of a fluid flowing through a main channel, the flow rate measuring device including a heater configured to heat a fluid, a temperature detector configured to detect a temperature of the fluid, and a flow rate correcting unit configured to correct a flow rate of the fluid flowing through a main channel based on a change tendency of the detected value by the temperature detector over time.

Accordingly, the flow rate measuring device can reduce the influence of physical properties of a fluid similar in composition or type based on a tendency of the output of the temperature detector to change over time from the start of application of heat to the fluid and thus can output an accurate flow rate that is less susceptible to the flow rate dependence.

Further, according to the present invention, the flow rate correcting unit may include a correcting unit configured to correct the flow rate of the fluid flowing through the main channel based on a first transient period from start of application of heat to the fluid until the detection value becomes greater than a first predetermined percentage of a thermal equilibrium temperature of the fluid heated near the detector.

Herein, the first predetermined percentage is, for example, an index indicating a degree relative to the outputs of a plurality of temperature detectors during the application of heat and is represented as 100% when the fluid heated by the heater is in the thermal equilibrium. As described above, correcting the flow rate of the fluid based on the first transient period from the start of application of heat to the fluid until the output of the temperature detector becomes greater than the first predetermined percentage of the thermal equilibrium temperature of the fluid thus heated makes it possible to output a flow rate that is lower in dependence on the physical properties affecting thermal diffusion of a fluid similar in composition or type.

Further, according to the present invention, the flow rate correcting unit may include a correcting unit configured to correct the flow rate of the fluid flowing through the main channel based on a slope of a change over time of the detection value from start of application of heat to the fluid until the detection value becomes equal to a second predetermined percentage of a thermal equilibrium temperature of the fluid heated near the temperature detector.

Herein, as with the first predetermined percentage, the second predetermined percentage is an index indicating a degree relative to the outputs of a plurality of temperature detectors during the application of heat and is represented as 100% when the fluid heated by the heater is in the thermal equilibrium. As described above, making the correction based on the slope of the change over time from the start of application of heat to the fluid until the outputs of the temperature detectors become equal to the second predetermined percentage of the thermal equilibrium temperature of the fluid heated makes it possible to output a flow rate that is lower in dependence on the physical properties affecting thermal diffusion of a fluid similar in composition or type.

Further, according to the present invention, the flow rate correcting unit may include a correcting unit configured to correct the flow rate of the fluid flowing through the main channel based on a second transient period from stop of application of heat to the fluid until the detection value equal to the thermal equilibrium temperature becomes less than a third predetermined percentage of the thermal equilibrium temperature.

Herein, as with the first predetermined percentage, the third predetermined percentage is a relative index and is represented as 100% when it is in the thermal equilibrium. As described above, making the correction based on the second transient period until the output of the temperature detector becomes less than the third predetermined percentage of the thermal equilibrium temperature of the fluid that has stopped being heated due to the stop of application of heat to the fluid makes it possible to output a flow rate that is lower in dependence on the physical properties affecting thermal diffusion of a fluid.

Further, according to the present invention, the flow rate correcting unit may include a correcting unit configured to correct the flow rate of the fluid flowing through the main channel based on the detection value detected when a third transient period elapses from start of application of heat to the fluid. This makes it possible to directly correct the flow rate of the fluid flowing through the main channel based on the output of the temperature detector when the third transient period elapses. This makes a load on an arithmetic unit lower and thus allows faster processing.

Further, according to the present invention, the flow rate correcting unit may obtain, when the fluid is stopped flowing, information indicating the tendency of the detection value to change over time for use in correcting the flow rate of the fluid flowing through the main channel. This makes the flow rate dependence of the physical properties affecting thermal diffusion of a fluid lower and thus allows an increase in accuracy of flow rate measurement.

Further, according to the present invention, the heater and the temperature detector may be arranged in a direction intersecting a flow direction of the fluid. A plurality of the temperature detectors may be provided, and at least two of the plurality of temperature detectors may be arranged to cause the heater to be interposed between the at least two temperature detectors. Further, the temperature detector may include a cold junction and a hot junction, and the temperature detector may be disposed to have the cold junction located upstream in the flow direction of the fluid and the hot junction located downstream in the flow direction of the fluid. Even such a structure makes the flow rate dependence of the physical properties affecting thermal diffusion of a fluid lower and thus allows an increase in accuracy of flow rate measurement.

Further, provided according to the present invention may be a flow rate measuring unit including the flow rate measuring device, a display configured to display a flow rate corrected by the flow rate correcting unit, and an integrated controller configured to control the flow rate measuring device and the display.

This makes it possible to manufacture a gas meter capable of outputting and displaying the flow rate of the fluid more easily or efficiently.

Further, provided according to the present invention may be a gas meter including the flow rate measuring device, a display configured to display a flow rate measured by the flow rate measuring device, an integrated controller configured to control the flow rate measuring device and the display, a power supply unit configured to supply power to the flow rate measuring device, the display, and the integrated controller, a casing configured to house the flow rate measuring device, the display, and the integrated controller, and an operation unit configured to allow operation settings of the flow rate measuring device to be made from outside of the casing.

Accordingly, it is possible to provide a gas meter capable of measuring a flow rate with higher accuracy.

Effect of the Invention

According to the present invention, it is possible for the flow rate measuring device to measure a flow rate with higher accuracy.

MODE FOR CARRYING OUT THE INVENTION

Application Example

Figure 1:
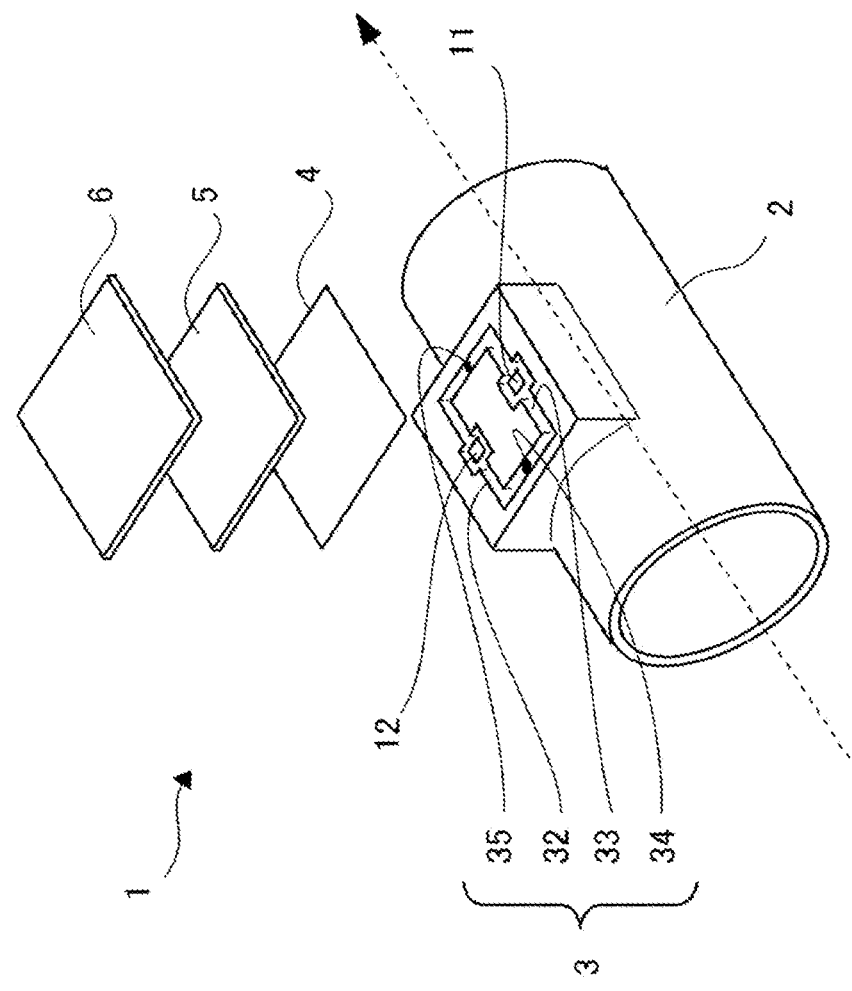
FIG. 1 is an exploded perspective view of an example of a flow rate measuring device according to a first embodiment of the present invention.
Figure 2:
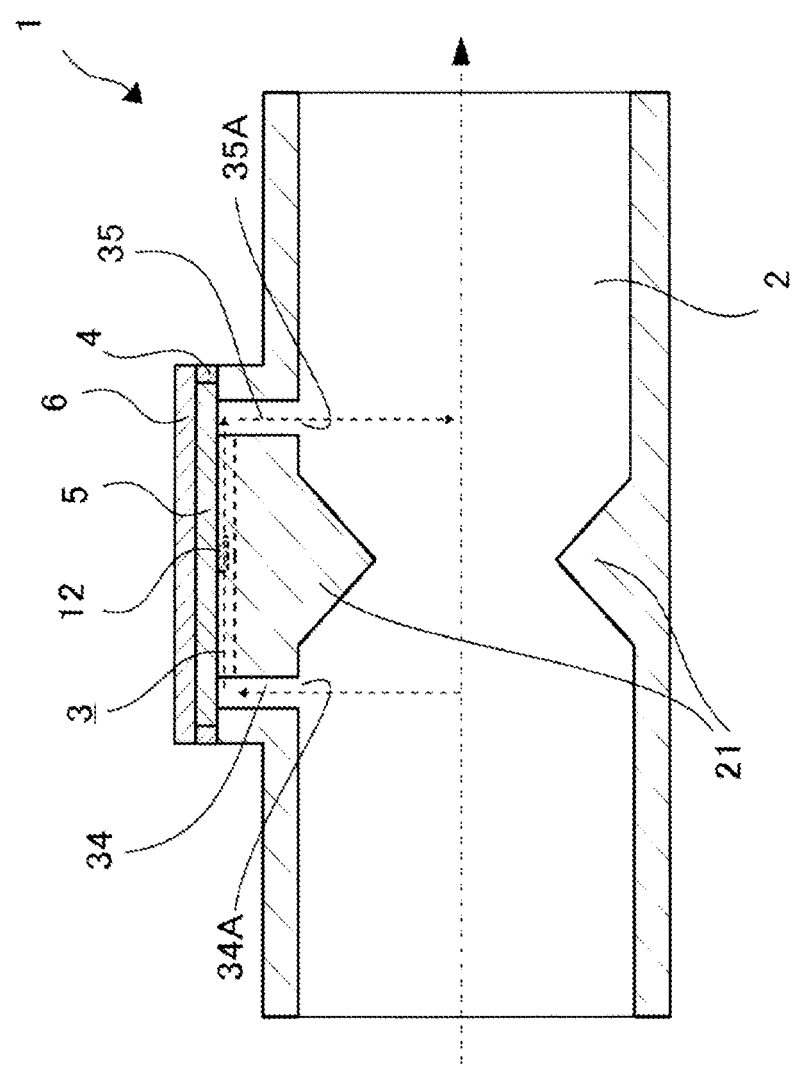
FIG. 2 is a cross-sectional view of the example of the flow rate measuring device according to the first embodiment of the present invention.
Figure 4:
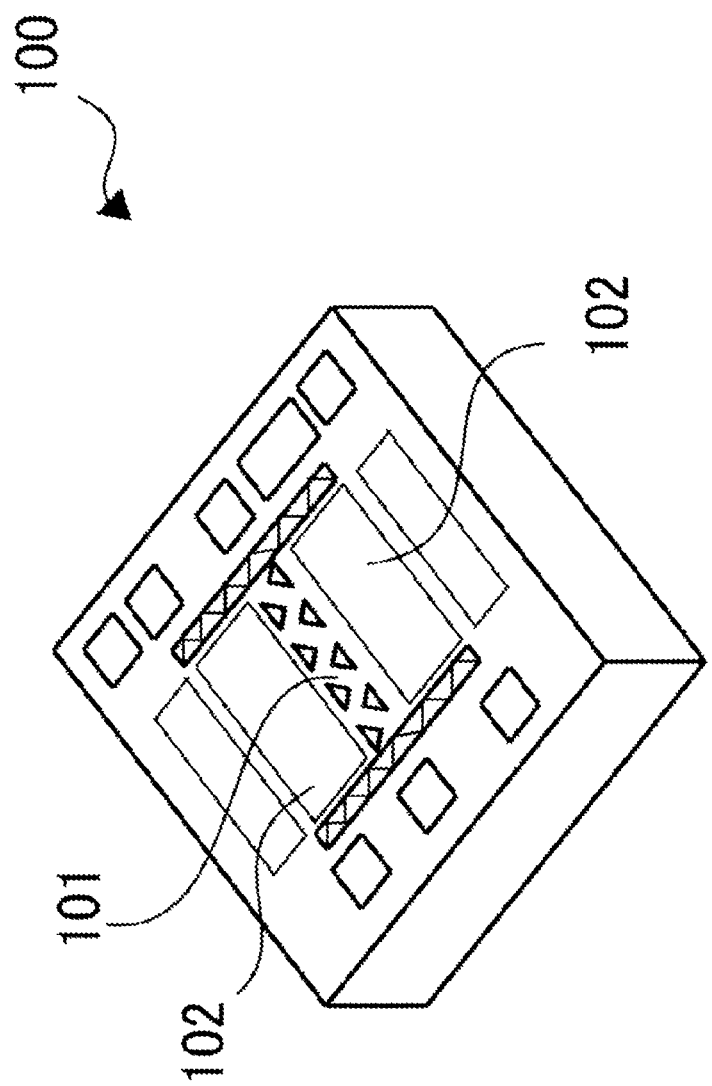
FIG. 4 is a perspective view of an example of a sensor element according to the first embodiment of the present invention.

Hereinafter, an application example of the present invention will be described with reference to the drawings. The present invention is applied to, for example, a thermal flow rate measuring device 1 as shown in FIG. 1. As shown in FIG. 2, a flow rate measuring device 1 is configured to divert some of a fluid flowing through a main channel section 2 to a flow rate detector 11 to measure a flow rate in the flow rate detector 11 having a strong correlation with a flow rate of the fluid flowing through the main channel section 2. As shown in FIG. 4, a sensor element applied to the flow rate detector 11 includes two temperature detectors 102 and a micro-heater (heater) 101 interposed between the two temperature detectors 102.

Figures 5A, 5B:
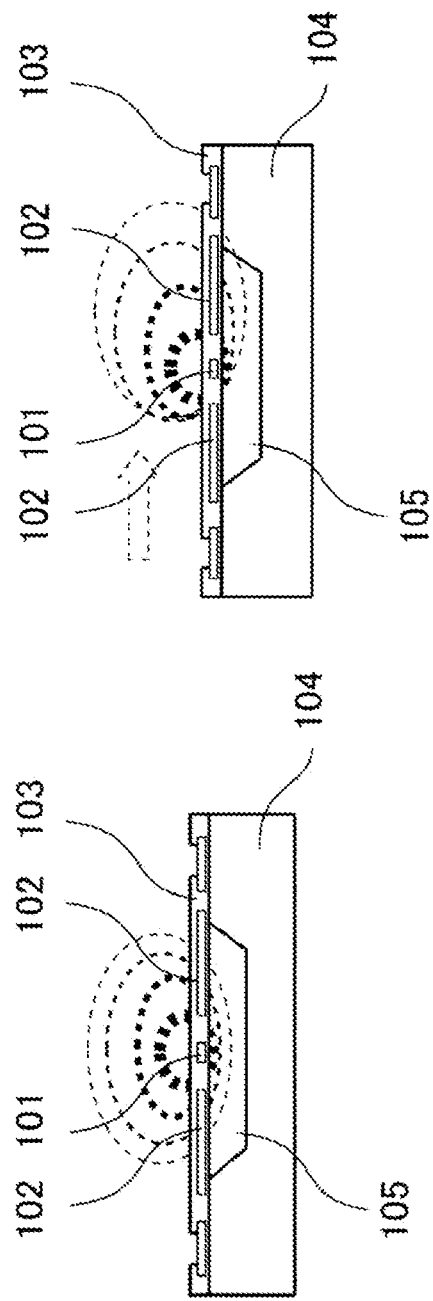
FIGS. 5A and 5B are cross-sectional views of the sensor element according to the first embodiment of the present invention given for describing a mechanism of the sensor element.

On a measurement principle, when no fluid flows, temperature distribution around the micro-heater 101 is approximately uniform as shown in FIG. 5A. On the other hand, for example, when a fluid that is unheated flows in a direction indicated by a dashed arrow shown in FIG. 5B, the fluid is higher in temperature in a downstream side of the micro-heater 101 than in an upstream side of the micro-heater 101. As described above, a correlation between a temperature difference $\Delta T$ between the temperatures detected by the two temperature detectors 102 and the flow rate of the fluid flowing over the two temperature detectors 102 based on an imbalance in heater heat distribution is used.

Figure 8:
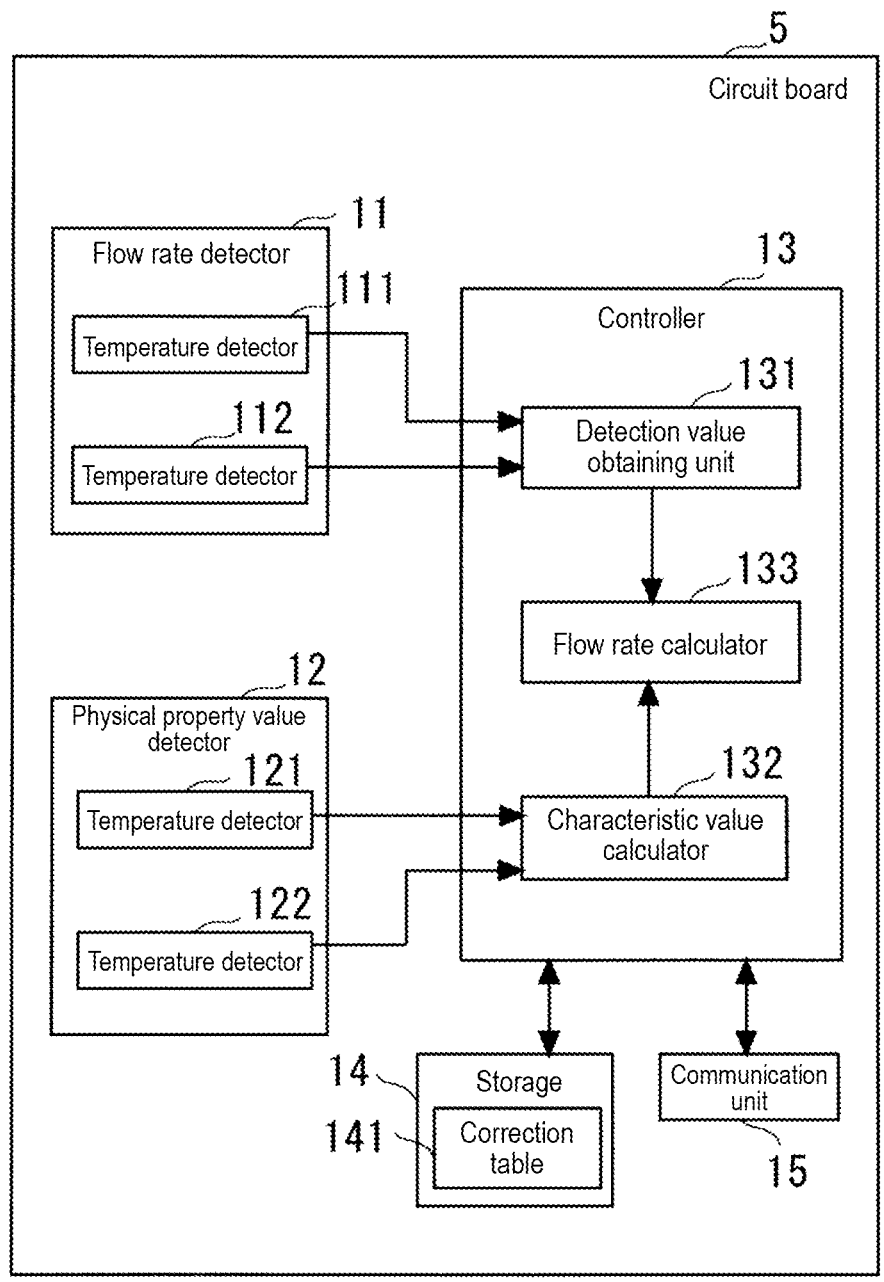
FIG. 8 is a functional block diagram of a circuit board according to the first embodiment of the present invention.

Further, as shown in the functional block diagram of the flow rate measuring device 1 shown in FIG. 8, the output of the flow rate detector 11 is transmitted to a detection value obtaining unit 131 of a controller 13 implemented by a central processing unit (CPU) contained on the circuit board 5, and a flow rate calculator 133 makes a necessary correction and the like and then calculates a flow rate as final output.

In some case, a fluid similar in composition or type may fall within a predetermined range of the temperature difference ΔT between temperatures detected by the two temperature detectors 102. For example, when a fluid containing a plurality of types of substances close in specific heat value to each other, it becomes difficult to reduce flow rate dependence of the correction made by the flow rate calculator 133 because it depends on physical characteristics such as the mass of the fluid or ease of movement.

Figure 9:
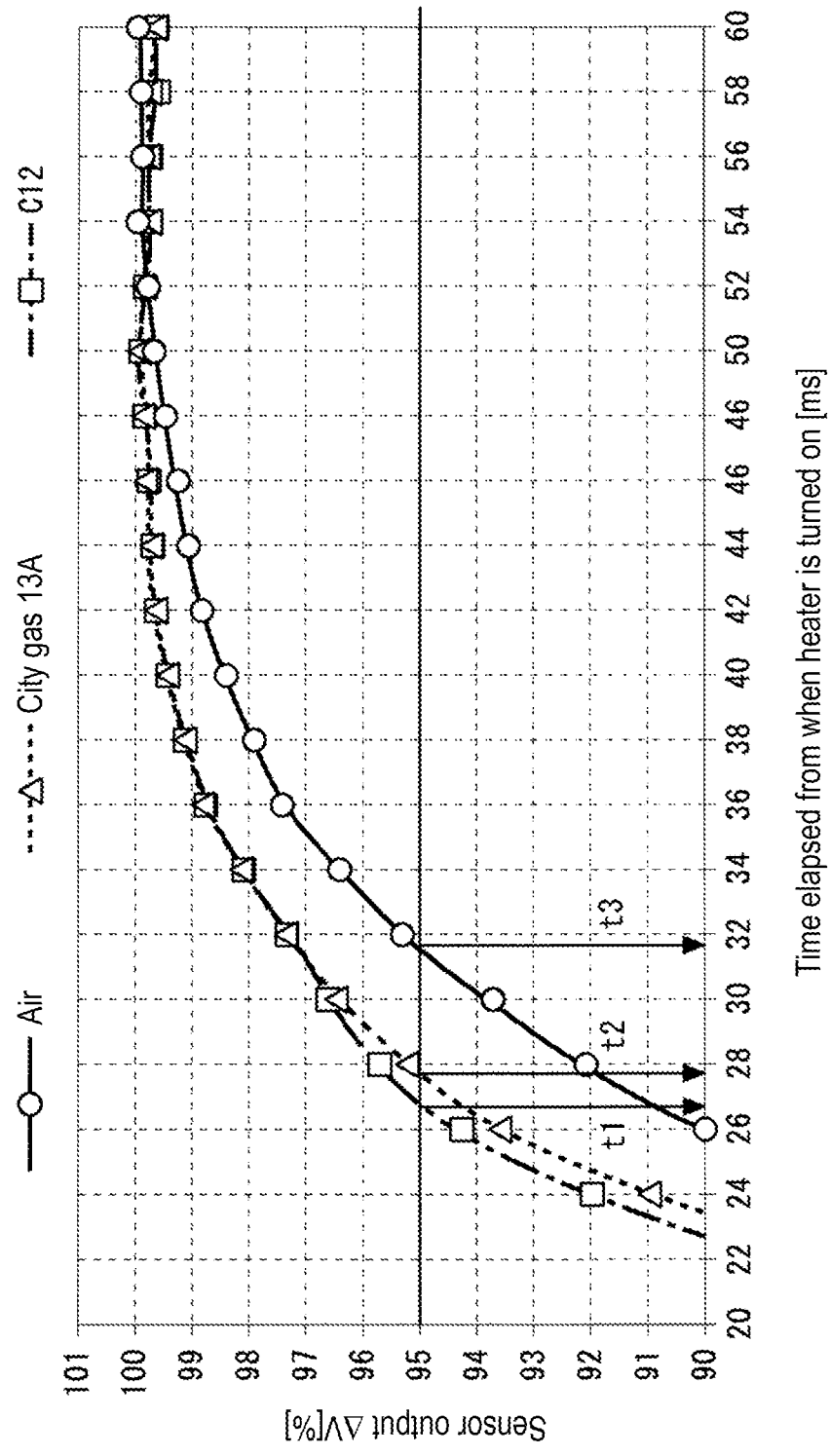
FIG. 9 is a graph showing a relationship between each fluid and a transient time until the fluid reaches thermal equilibrium.
Figure 10:
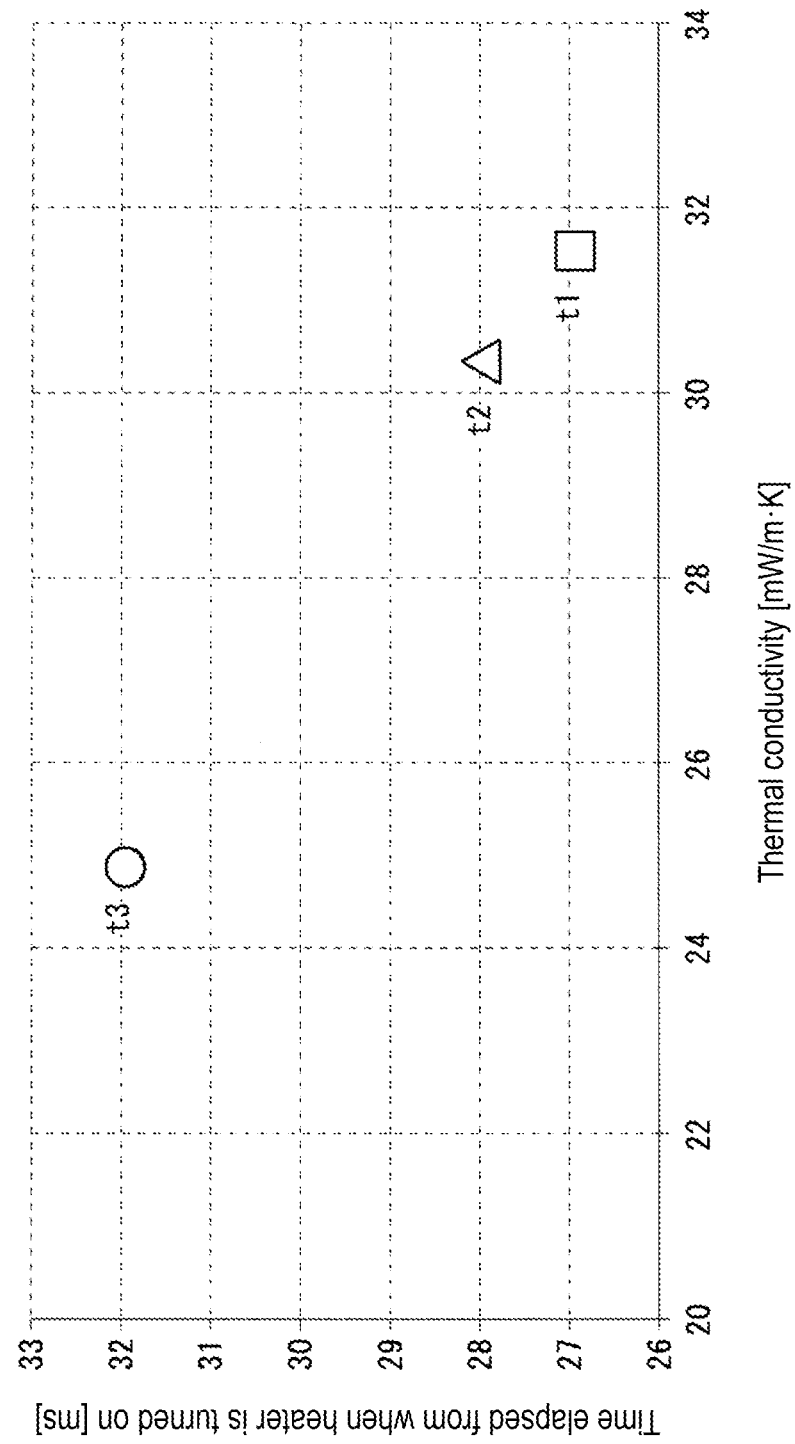
FIG. 10 is a graph showing a relationship between a rise time and thermal conductivity of each fluid.

FIG. 9 shows that a transient response characteristic appearing over time from the start of application of heat made by the micro-heater 101 to the thermal equilibrium has a correlation with the physical properties of the fluid. FIG. 10 shows that a rise time from the start of application of heat to the thermal equilibrium has a correlation with the physical properties of the fluid. Herein, examples of the physical properties of the fluid include characteristics related to thermal diffusion such as thermal conductivity, specific heat, viscosity, and density.

Therefore, according to the present invention, a flow rate correcting unit configured to correct the flow rate of the fluid flowing through the main channel based on a tendency of output of a plurality of temperature detectors to change over time is provided. This allows the correction to be made based on the transient response characteristic appearing over time from the start of application of heat to the thermal equilibrium, so that the influence of the physical properties of a fluid similar in composition or type can be reduced, and an accurate flow rate that is less susceptible to the flow rate dependence can be output accordingly.

Figure 15:
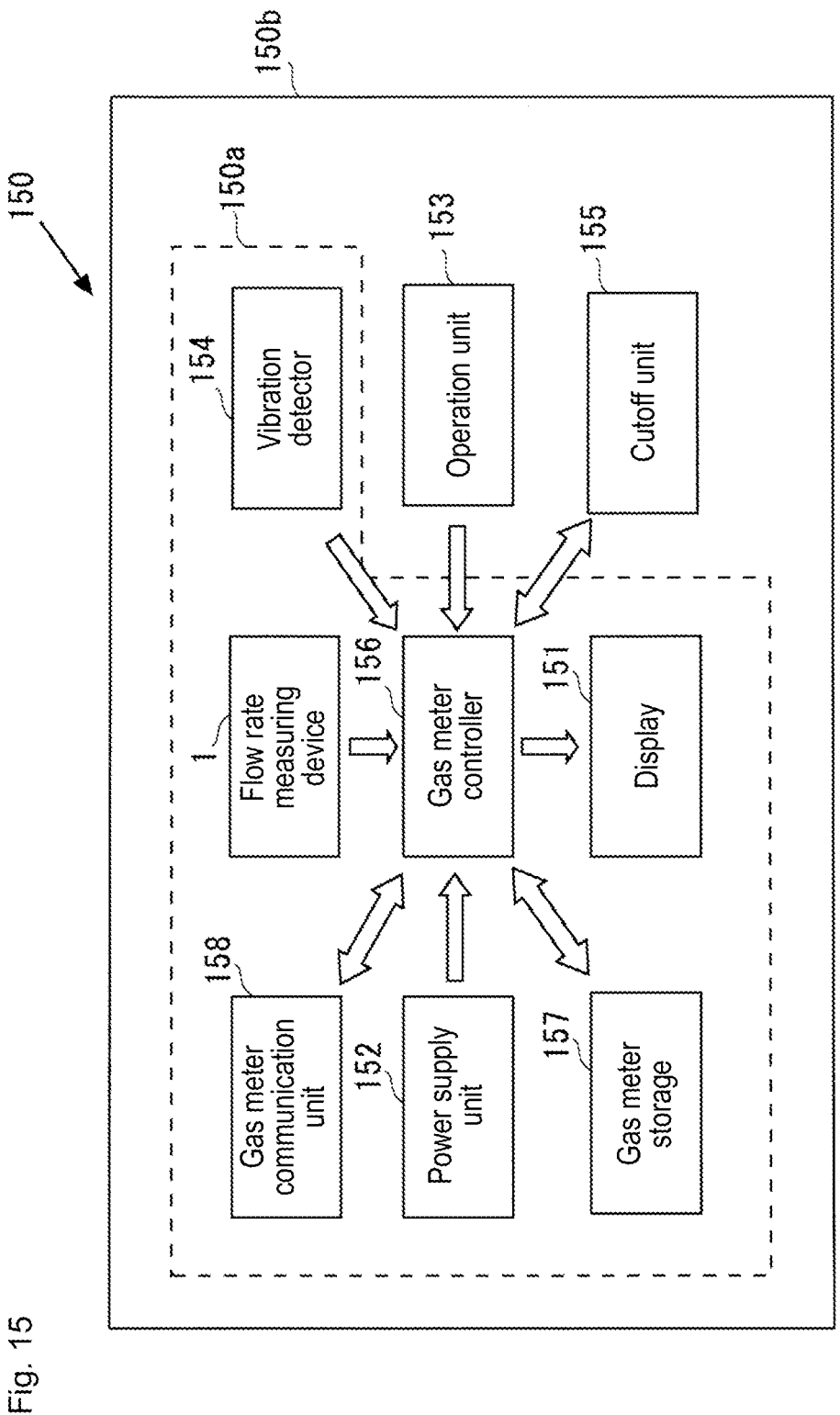
FIG. 15 is a functional block diagram of a gas meter according to a fifth embodiment of the present invention.

Note that the present invention may be applied to the thermal flow rate measuring device 1 as described above, or may be applied to a gas meter 150 provided with the flow rate measuring device 1 as shown in FIG. 15. The gas meter 150 includes, in addition to the flow rate measuring device 1, a display 151, a power supply unit 152, an operation unit 153, a vibration detector 154, a cutoff unit 155, a gas meter controller 156, a gas meter storage 157, and a gas meter communication unit 158.

Further, the present invention may be applied to a flow rate measuring device unit 150a that is a single unit including the flow rate measuring device 1, the display 151, the power supply unit 152, and the gas meter controller 156 shown in FIG. 15 and is easily incorporated into the gas meter 150 when the gas meter 150 is manufactured.

First Embodiment

Hereinafter, a flow rate measuring device according to an embodiment of the present invention will be described in more detail with reference to the drawings.

<Device Structure>

FIG. 1 is an exploded perspective view of an example of the flow rate measuring device 1 according to the embodiment. FIG. 2 is a cross-sectional view of the example of the flow rate measuring device 1. The flow rate measuring device 1 is incorporated into, for example, a gas meter, combustion equipment, an internal combustion engine such as an automobile, a fuel cell, other industrial equipment such as medical equipment, or an embedded device to measure a flow rate of a fluid flowing through a channel. Note that a dashed arrow shown in FIGS. 1 and 2 represents a flow direction of the fluid.

Further, as shown in FIG. 1, the flow rate measuring device 1 according to the embodiment includes the main channel section 2, a sub-channel section 3, a gasket 4, the circuit board 5, and a cover 6. As shown in FIGS. 1 and 2, according to the embodiment, the flow rate measuring device 1 includes the sub-channel section 3 branched from the main channel section 2. The sub-channel section 3 is provided with the flow rate detector 11 and a physical property value detector 12. The flow rate detector 11 and the physical property value detector 12 are each made up of a thermal flow sensor including a heater made up of a micro-heater and a temperature detector made up of a thermopile. Further, according to the embodiment, a physical property value of a fluid is detected by the physical property value detector 12, and a flow rate detected by the flow rate detector 11 is corrected based on the physical property value of the fluid, but the flow rate measuring device 1 need not include the physical property value detector 12.

The main channel section 2 is a tubular member through which a channel (hereinafter, referred to as a main channel) of a fluid extends in a longitudinal direction. As shown in FIG. 2, on an inner peripheral surface of the main channel section 2, an inflow port (first inflow port) 34A and an outflow port (first outflow port) 35A are provided on an upstream side and a downstream side in a fluid flow direction, respectively. For example, a length of the main channel section 2 in an axial direction is about 50 mm, a diameter of the inner peripheral surface (an inner diameter of the main channel section 2) is about 20 mm, and an outer diameter of the main channel section 2 is about 24 mm, but the dimensions of the main channel section 2 are not limited to such dimensions. The main channel section 2 further has an orifice 21 provided between the inflow port 34A and the outflow port 35A. The orifice 21 is a resistance member smaller in inner diameter than the upstream and downstream sides of the main channel section 2 across the orifice 21, and the flow rate of the fluid flowing into the sub-channel section 3 can be adjusted in accordance with the size of the orifice 21.

In FIGS. 1 and 2, the sub-channel section 3 having a sub-channel branched from the main channel inside the sub-channel section is provided vertically above the main channel section 2. Further, the sub-channel provided in the sub-channel section 3 includes an inflow channel 34, a physical property value detection channel 32, a flow rate detection channel 33, and an outflow channel 35. Some of the fluid flowing through the main channel section 2 is diverted to the sub-channel section 3.

The inflow channel 34 causes the fluid flowing through the main channel section 2 to flow into the inflow channel 34 and diverts the fluid to the physical property value detection channel 32 and the flow rate detection channel 33. The inflow channel 34 is provided extending in a direction orthogonal to the fluid flow direction of the main channel section 2 and has one end communicating with the inflow port 34A and the other end communicating with the physical property value detection channel 32 and the flow rate detection channel 33. Some of the fluid flowing through the main channel section 2 is further diverted to the physical property value detection channel 32 and the flow rate detection channel 33 via the inflow channel 34. A flow rate of the fluid flowing into the physical property value detection channel 32 and the flow rate detection channel 33 varies in a manner that depends on the flow rate of the fluid flowing through the main channel section 2. This allows the flow rate detector 11 to detect a value corresponding to the amount of the fluid flowing through the main channel section 2.

As shown in FIG. 1, the physical property value detection channel 32 is provided vertically above the main channel section 2, extends parallel to the main channel section 2, and has an approximately U-shaped cross section when viewed from above. In the physical property value detection channel 32, the physical property value detector 12 configured to detect a physical property value of a fluid is disposed. The physical property value detection channel 32 has one end communicating with the inflow port 34A via the inflow channel 34 and the other end communicating with the outflow port 35A via the outflow channel 35.

Likewise, the flow rate detection channel 33 extends parallel to the fluid flow direction of the main channel section 2 and has an approximately U-shaped cross section when viewed from above. In the flow rate detection channel 33, the flow rate detector 11 configured to detect a flow rate of a fluid is disposed. The flow rate detection channel 33 has one end communicating with the inflow port 34A via the inflow channel 34 and the other end communicating with the outflow port 35A via the outflow channel 35. Note that the physical property value detector 12 and the flow rate detector 11 are contained on the circuit board 5. The circuit board 5 is disposed to cover, from above, the physical property value detection channel 32 and the flow rate detection channel 33 each opening upward and to position the physical property value detector 12 in the physical property value detection channel 32 and position the flow rate detector 11 in the flow rate detection channel 33.

The outflow channel 35 causes the fluid flowing through the physical property value detection channel 32 and the flow rate detection channel 33 to flow out to the main channel section 2. The outflow channel 35 is provided extending orthogonal to the main channel section 2 and has one end communicating with the outflow port 35A and the other end communicating with the physical property value detection channel 32 and the flow rate detection channel 33. The fluid flowing through the physical property value detection channel 32 and the flow rate detection channel 33 flows out to the main channel section 2 via the outflow channel 35.

According to the embodiment, as described above, the fluid flowing in from the single inflow port 34A is diverted to the physical property value detection channel 32 and the flow rate detection channel 33. This allows the flow rate detector 11 and the physical property value detector 12 to detect the physical property value and the flow rate of the fluid respectively based on the fluid under substantially the same conditions on temperature and density. Note that, in the flow rate measuring device 1, after the gasket 4 is fitted into the sub-channel section 3, the circuit board 5 is disposed and then fixed to the sub-channel section 3 by the cover 6, thereby ensuring airtightness inside the sub-channel section 3.

Figure 3:
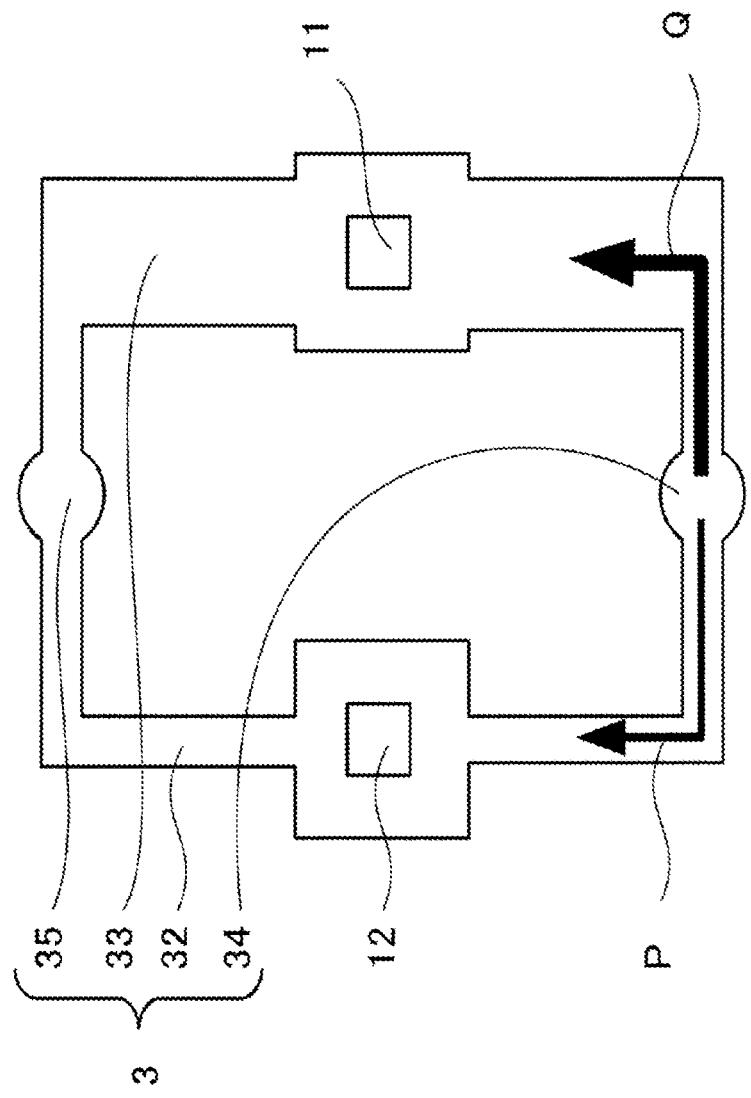
FIG. 3 is a plan view of a sub-channel section according to the first embodiment of the present invention.

FIG. 3 is a plan view of the sub-channel section 3 shown in FIG. 1. As shown in FIG. 3, the physical property value detection channel 32 and the flow rate detection channel 33 are arranged symmetrically about a line (not shown) connecting a position of the center axis of the inflow channel 34 and a position of the center axis of the outflow channel 35 when viewed from above. Arrows P and Q schematically represent a ratio between the respective flow rates of the fluid diverted to the physical property value detection channel 32 and the flow rate detection channel 33. According to the embodiment, the respective cross-sectional areas of the physical property value detection channel 32 and the flow rate detection channel 33 are designed to make the respective flow rates of the fluid thus diverted in the ratio of P to Q.

Although the respective flow rates of the fluid flowing through the physical property value detection channel 32 and the flow rate detection channel 33 actually vary in a manner that depends on the flow rate of the fluid flowing through the main channel section 2, the size of the sub-channel section 3 relative to the size of the main channel section 2, the size of the orifice 21, and the respective widths of the physical property value detection channel 32 and the flow rate detection channel 33 are designed so as to bring the flow rate of the fluid flowing through the physical property value detection channel 32 within a detection range of the physical property value detector 12 and to bring the flow rate of the fluid flowing through the flow rate detection channel 33 within a detection range of the flow rate detector 11 under normal usage. Note that the widths of the physical property value detection channel 32 and the flow rate detection channel 33 thus shown are merely examples and are not limited to the examples shown in FIG. 3.

As described above, in the flow rate measuring device 1, adjusting the respective widths of the physical property value detection channel 32 and the flow rate detection channel 33 allows the respective flow rates of the fluid diverted to the physical property value detection channel 32 and the flow rate detection channel 33 to be individually regulated. This allows the flow rate of the fluid flowing through the physical property value detection channel 32 to be regulated within the detection range of the physical property value detector 12 and allows the flow rate of the fluid flowing through the flow rate detection channel 33 to be regulated within the detection range of the flow rate detector 11.

Neither the physical property value detection channel 32 nor the flow rate detection channel 33 is limited to the structure having an approximately U-shape when viewed from above. That is, the physical property value detection channel 32 and the flow rate detection channel 33 may have a different shape as long as their respective widths (cross-sectional areas) are set to make the respective flow rates of the fluid flowing through the physical property value detection channel 32 and the flow rate detection channel 33 regulatable.

Further, the physical property value detection channel 32 and the flow rate detection channel 33 each have a space with an approximately square shape, when viewed from above, where the physical property value detector 12 and the flow rate detector 11 are disposed, but the present invention is not limited to such a structure. The respective shapes of the physical property value detection channel 32 and the flow rate detection channel 33 may be any shape as long as the physical property value detector 12 or the flow rate detector 11 can be disposed, and the shapes may be determined in accordance with the respective shapes of the physical property value detector 12 and the flow rate detector 11 to be disposed.

Therefore, for example, when the size of the physical property value detector 12 is smaller than the width of the physical property value detection channel 32, the width of the space in the physical property value detection channel 32 where the physical property value detector 12 is disposed may be equal to the width of the other portion of the physical property value detection channel 32. That is, this makes the portion extending in the longitudinal direction of the physical property value detection channel 32 approximately uniform in width. Note that the same applies to the flow rate detection channel 33.

As described above, the respective flow rates of the fluid flowing through the physical property value detection channel 32 and the flow rate detection channel 33 are lower than the flow rate of the fluid flowing through the main channel section 2, but vary in a manner that depends on the flow rate of the fluid flowing through the main channel section 2. When the assumption is made that the flow rate detector 11 and the physical property value detector 12 are arranged in the main channel section 2, it is necessary to increase respective scales of the flow rate detector 11 and the physical property value detector 12 in accordance with the flow rate of the fluid flowing through the main channel section 2, but according to the embodiment, providing the sub-channel section 3 branched from the main channel section 2 allows the flow rate of the fluid to be measured by the flow rate detector 11 and the physical property value detector 12 that are small in scale.

Further, according to the embodiment, the physical property value detection channel 32 is smaller in cross-sectional area than that of the flow rate detection channel 33, and the amount of fluid flowing through the physical property value detection channel 32 is lower than the amount of fluid flowing through the flow rate detection channel 33 as indicated by the sizes of arrows P and Q shown in FIG. 3. As described above, making the amount of fluid flowing through the physical property value detector 12 lower than the amount of fluid flowing through the flow rate detector 11 allows a reduction in error arising from the influence of the flow rate when the physical property value detector 12 detects the physical property value and temperature of the fluid.

FIG. 4 is a perspective view of an example of the sensor element used in the flow rate detector 11 and the physical property value detector 12. FIGS. 5A and 5B are cross-sectional views of the sensor element given for describing a mechanism of the sensor element. A sensor element 100 includes the micro-heater (also referred to as a heater) 101 and the two thermopiles (also referred to as temperature detectors) 102 provided symmetrically about the micro-heater 101. That is, the micro-heater 101 and the two thermopiles 102 are arranged side by side in a predetermined direction. As shown in FIGS. 5A and 5B, an insulation thin film 103 is provided on and beneath the micro-heater 101 and the thermopiles 102, and the micro-heater 101, the thermopiles 102, and the insulation thin film 103 are provided on a silicon base 104. A cavity (hole) 105 formed by etching or the like is provided in the silicon base 104 under the micro-heater 101 and the thermopiles 102.

The micro-heater 101 is, for example, a resistance member made of polysilicon. FIGS. 5A and 5B schematically show a temperature distribution when the micro-heater 101 generates heat, represented by ovals of a dashed line. Note that the thicker the dashed line, the higher the temperature. When no fluid flows, the temperature distribution around the micro-heater 101 is approximately uniform as shown in FIG. 5A. On the other hand, for example, when a fluid flows in a direction indicated by a dashed arrow shown in FIG. 5B, the unheated fluid flows into the upstream side of the micro-heater 101, which makes the fluid in the upstream side of the micro-heater 101 lower in temperature than the fluid in the downstream side of the micro-heater 101. The sensor element 100 outputs a value indicating the flow rate determined based on such an uneven distribution of heater heat.

An output voltage ΔV of the sensor element is expressed by, for example, the following equation (1).

[Math. 1]

$$\Delta V = A \cdot (T_h - T_a) \sqrt[b]{v_f} \quad (1)$$

Herein, Th denotes a temperature of the micro-heater 101 (a temperature at an end of each thermopile 102 adjacent to the micro-heater 101), Ta denotes the lower temperature at an end of each thermopile 102 remote from the micro-heater 101 (in FIG. 5A, the lower temperature corresponds to the temperature at the left end of the left thermopile 102 on the left side or the temperature at the right end of the right thermopile 102 on the right side, and in FIG. 5B the lower temperature corresponds to the temperature at the left end of the left thermopile 102 of the left side that is the upstream end), Vf denotes the average value of the flow rate, and A and b denotes predetermined constants.

Further, the circuit board 5 of the flow rate measuring device 1 includes a controller (not shown) implemented by an integrated circuit (IC) or the like and calculates the flow rate based on the output of the flow rate detector 11. Further, the circuit board 5 may calculate a predetermined characteristic value based on the output of the physical property value detector 12 and correct the flow rate using the characteristic value.

<Flow Rate Detector and Physical Property Value Detector>

Figure 6:
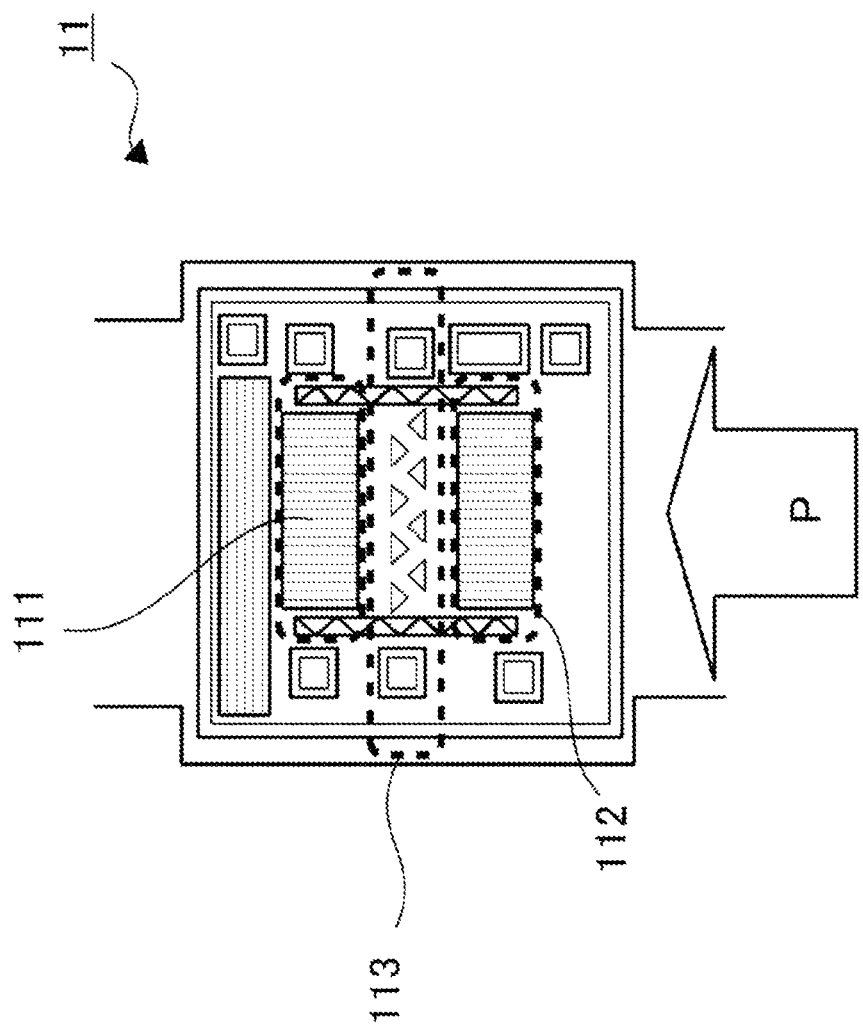
FIG. 6 is a plan view schematically showing a structure of a flow rate detector according to the first embodiment of the present invention.
Figure 7:
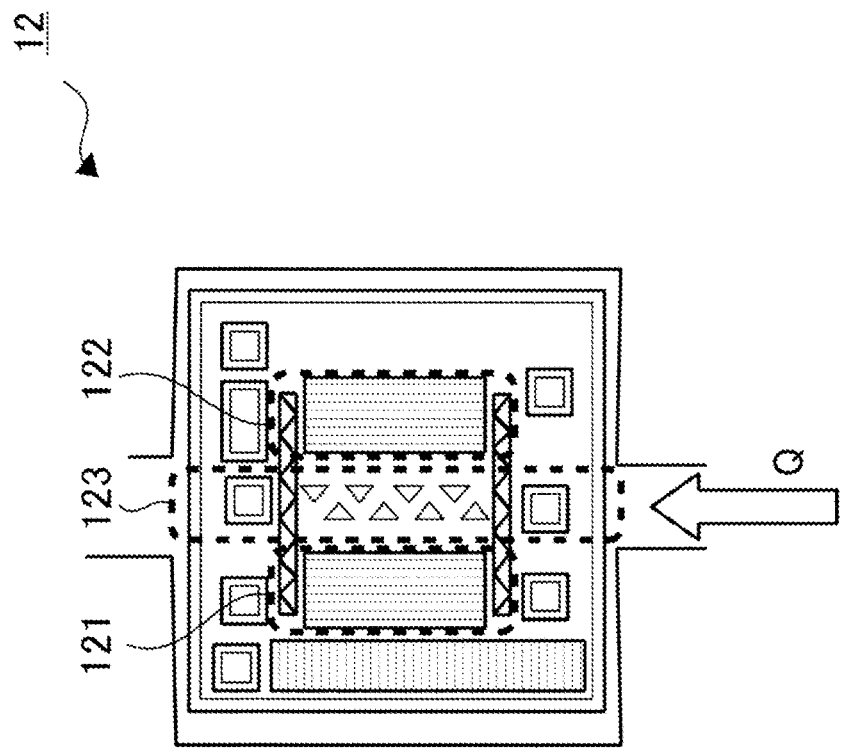
FIG. 7 is a plan view schematically showing a structure of a physical property value detector according to the first embodiment of the present invention.

FIG. 6 is a plan view of the flow rate detector 11 shown in FIG. 1, schematically showing the structure of the flow rate detector 11, and FIG. 7 is a plan view of the physical property value detector 12 shown in FIG. 1, schematically showing the structure of the physical property value detector 12. As shown in FIG. 6, the flow rate detector 11 includes a first thermopile (also referred to as a temperature detector) 111 and a second thermopile (also referred to as a temperature detector) 112 that detect the temperature of the fluid, and a micro-heater (also referred to as a heater) 113 that heats the fluid. In the flow rate detector 11, the heater 113, the temperature detector 111, and the temperature detector 112 are arranged side by side in a flow direction P of the fluid. Further, the heater 113, the temperature detector 111, and the temperature detector 112 each have an approximately rectangular shape when viewed from above and have its longitudinal direction orthogonal to the flow direction P of the fluid.

The temperature detector 111 and the temperature detector 112, with the temperature detector 112 disposed upstream side of the heater 113 and the temperature detector 111 disposed downstream side of the heater 113, detect the temperatures at positions symmetrical about the heater 113 sandwiched by temperature detectors.

In the flow rate measuring device 1, the sensor elements 100 having substantially the same structure are used in the physical property value detector 12 and the flow rate detector 11. The sensor element 100 of the physical property value detector 12 and the sensor element 100 of the flow rate detector 11 are disposed at their respective angles relative to the fluid flow direction, the angles being different from each other by 90 degrees in the plan view of the sensor elements 100. This allows the sensor elements 100 having the same structure to be used in the physical property value detector 12 and the flow rate detector 11 and thus allows a reduction in manufacturing cost of the flow rate measuring device 1.

On the other hand, as shown in FIG. 7, the physical property value detector 12 includes a first thermopile (also referred to as a temperature detector) 121 and a second thermopile (also referred to as a temperature detector) 122 that detect the temperature of the fluid, and a micro-heater (also referred to as a heater) 123 that heats the fluid. In the physical property value detector 12, the heater 123, the temperature detector 121, and the temperature detector 122 are arranged side by side in a direction orthogonal to a flow direction Q of the fluid. Further, the heater 123, the temperature detector 121, and the temperature detector 122 each have an approximately rectangular shape when viewed from above and have its longitudinal direction along the flow direction Q of the fluid. Further, the temperature detector 121 and the temperature detector 122 are arranged right-left symmetrically about the heater 123 and detect temperatures at positions symmetrical about the heater 123. This makes values measured by the temperature detector 121 and the temperature detector 122 approximately equal to each other, and the average of the values or either one of the values may be used.

Herein, since the temperature is unevenly distributed toward the downstream side due to the flow of the fluid, a change in the temperature distribution in the direction orthogonal to the flow direction is smaller than a change in the temperature distribution in the fluid flow direction. Therefore, arranging the temperature detector 121, the heater 123, and the temperature detector 122 in this order in the direction orthogonal to the flow direction of the fluid allows a reduction in change in the output characteristics of the temperature detector 121 and the temperature detector 122 due to the change in the temperature distribution. This in turn allows a reduction in the influence of the change in the temperature distribution due to the flow of the fluid and allows an increase in detection accuracy of the physical property value detector 12.

Further, since the heater 123 is disposed with its longitudinal direction parallel to the flow direction of the fluid, the heater 123 can heat the fluid over a wide range in the flow direction of the fluid. This allows, even when the temperature is unevenly distributed toward the downstream side due to the flow of the fluid, a reduction in change in the output characteristics of the temperature detector 121 and the temperature detector 122. Likewise, when the fluid temperature is measured, it is possible to reduce an error in the measured value due to the flow rate. Note that the fluid temperature may be obtained by subtracting an amount of a temperature rise due to heat applied by the heater 123 from the temperatures detected by the temperature detector 121 and the temperature detector 122, or may be detected with no heat applied by the heater 123. Accordingly, the use of the physical property value detector 12 allows a reduction in the influence of the change in the temperature distribution due to the flow of the fluid and thus allows an increase in detection accuracy of the physical property value and the fluid temperature.

Furthermore, since the temperature detector 121 and the temperature detector 122 are arranged with their respective longitudinal directions parallel to the flow direction of the fluid, the temperature detector 121 and the temperature detector 122 can detect the temperature over a wide range in the flow direction of the fluid. This allows, even when the temperature is unevenly distributed toward the downstream side due to the flow of the fluid, a reduction in change in the output characteristics of the temperature detector 121 and the temperature detector 122. This in turn allows a reduction in the influence of the change in the temperature distribution due to the flow of the fluid and allows an increase in detection accuracy of the physical property value detector 12.

<Functional Configuration>

FIG. 8 is a block diagram of an example of a functional configuration of the flow rate measuring device 1. The flow rate measuring device 1 includes the flow rate detector 11, the physical property value detector 12, the controller 13, a storage 14, and a communication unit 15. The flow rate detector 11 includes the temperature detector 111 and the temperature detector 112. The physical property value detector 12 includes the temperature detector 121 and the temperature detector 122. Note that the heater 113 shown in FIG. 6 and the heater 123 shown in FIG. 7 are not shown here. Further, the controller 13 includes the detection value obtaining unit 131, a characteristic value calculator 132, and the flow rate calculator 133. The storage 14 includes a storage medium such as a flash memory, a random access memory (RAM), or a read only memory (ROM) and holds a correction table 141.

The flow rate detector 11 calculates a difference between a signal corresponding to the temperature detected by the temperature detector 111 and a signal corresponding to the temperature detected by the temperature detector 112 and outputs the difference to the detection value obtaining unit 131 of the controller 13. The physical property value detector 12 outputs a signal corresponding to the temperature detected by the temperature detector 121 to the characteristic value calculator 132. Note that the physical property value detector 12 may obtain the average of the signals corresponding to the temperatures detected by the temperature detector 121 and the temperature detector 122 and output the average to the characteristic value calculator 132. Further, the signal corresponding to the temperature may be obtained using either the temperature detector 121 or the temperature detector 122.

The detection value obtaining unit 131 obtains a detection value corresponding to the flow rate of the fluid output from the flow rate detector 11 at predetermined measurement intervals. The characteristic value calculator 132 calculates a characteristic value based on at least either one of the detection values of the temperature detector 121 and the temperature detector 122 of the physical property value detector 12. Note that the characteristic value calculator 132 may change the temperature of the micro-heater of the physical property value detector 12 and calculate the characteristic value by multiplying a difference between temperatures of the fluid detected by the temperature detector 121 and the temperature detector 122 before and after the change by a predetermined coefficient.

The flow rate calculator 133 calculates a flow rate based on the detection value obtained by the detection value obtaining unit 131. At this time, the flow rate calculator 133 may correct the flow rate using the characteristic value calculated by the physical property value detector 12. Further, the communication unit 15 transmits information processed by the controller 13 to the outside by radio or wire, receives a command or a configuration value from the outside by radio or wire, and passes the command or the configuration value to the controller 13. Note that the configuration value received from the outside contains data to be held in the correction table 141 of the storage 14. The correction table 141 stores, for example, a correction coefficient for the measurement value of the transient response characteristic.

A flow rate calculator 133 in the related art calculates a volume flow rate (l/min) of the fluid based on the ΔV obtained by the equation (1). When no fluid flows, the temperature distribution around the micro-heater 101 is approximately uniform as shown in FIG. 5A. The temperature distribution around the micro-heater 101 reaches the thermal equilibrium in accordance with the amount of heat applied by the micro-heater 101 and physical properties (thermal conductivity, specific heat, viscosity, density, and the like) of the fluid.

FIG. 9 is a graph showing a transient response characteristic of a sensor output SV in the vicinity of the thermal equilibrium appearing over time from the start of application of heat made by the micro-heater 101 to the thermal equilibrium, the sensor output SV being detected by the two thermopiles 102 provided symmetrically about the micro-heater 101. In FIG. 9, the vertical axis represents the output SV of the temperature detector 121 or 122 of the physical property value detector 12, and the horizontal axis represents the transient time (ms) from the start of application of heat made by the heater 123. Note that the output SV of the physical property value detector 12 is normalized such that the sensor output value under the thermal equilibrium is equal to 100%. Further, the output SV of the physical property value detector 12 may be the output of either the temperature detector 121 or the temperature detector 122, or may be the average of the outputs of the temperature detector 121 and the temperature detector 122. Hereinafter, the output of either the temperature detector 121 or the temperature detector 122 and the average of the outputs of the temperature detector 121 and the temperature detector 122 are simply referred to as the output of the temperature detector 121 or the like.

FIG. 9 shows that the transient time until the thermal equilibrium is reached varies in a manner that depends on the physical properties of the fluid. For example, it is shown that the transient time until the sensor output SV becomes equal to a value corresponding to 95% of the thermal equilibrium is affected by physical properties (thermal conductivity, specific heat, viscosity, density, and the like) related to thermal diffusion of the fluid, and thus varies for each of the three types of gases (air, city gas 13A, and C12). In the example shown in FIG. 9, a transient time t1 for the air is longer than a transient time t2 for the city gas 13A, and a transient time t3 for C12 is shorter than the transient time t2 for the city gas 13A.

FIG. 10 is a graph showing a relationship between the transient time and thermal conductivity λ (mW/m·K) for three types of gases shown in FIG. 9. In FIG. 10, the vertical axis represents the transient time (ms), and the horizontal axis represents the thermal conductivity. FIG. 10 shows that an air having the longest transient time is the lowest in thermal conductivity among the gases. It is also shown that the gas C12 having the shortest transient time is the highest in thermal conductivity among the gases. It is shown that the city gas 13A that is longer in transient time than the gas C12 and shorter than the air is higher in thermal conductivity than the air and lower than the gas C12. As described above, such fluids have a relationship where the longer the transient time from the start of application of heat until the predetermined percentage (95%) of the thermal equilibrium is reached, the lower the thermal conductivity.

Therefore, such a relationship between the transient response characteristic and the thermal conductivity is experimentally measured in advance, and the measurement result subjected to statistical processing such a calculation of a mean value and standard deviation distribution or the like is then stored in a memory or the like as the correction table, thereby allowing the physical property value of the fluid to be directly corrected based on the output SV from the physical property value detector 12 or the like. This allows flow rate measurement that is less susceptible to the influence of the composition of the fluid.

Herein, as shown in FIG. 9, a sensor rise time that is the transient time from the start of application of heat made by the heater until the sensor output (SV) becomes equal to the predetermined percentage of the equilibrium can be given as an example of the transient response characteristic. Further, a slope (ΔSV/Δt) of a change in the sensor output (SV) during a transient period from the start of application of heat made by the heater until the equilibrium is reached may be measured as the transient response characteristic. This is because the physical property value corresponding to the type of a fluid is reflected in the slope of a change in the sensor output.

Furthermore, as shown in the graph of FIG. 9, it is also possible to measure a sensor output corresponding to a predetermined transient time as the transient response characteristic. Likewise, a sensor fall time that is a transient time from the stop of application of heat made by the heater until the sensor output (SV) becomes less than the predetermined percentage of the equilibrium may be measured as the transient response characteristic. In either case, the physical property value corresponding to the type of fluid is reflected in the transient response of the measurement target.

<Flow Rate Measurement Processing>

Figure 11:
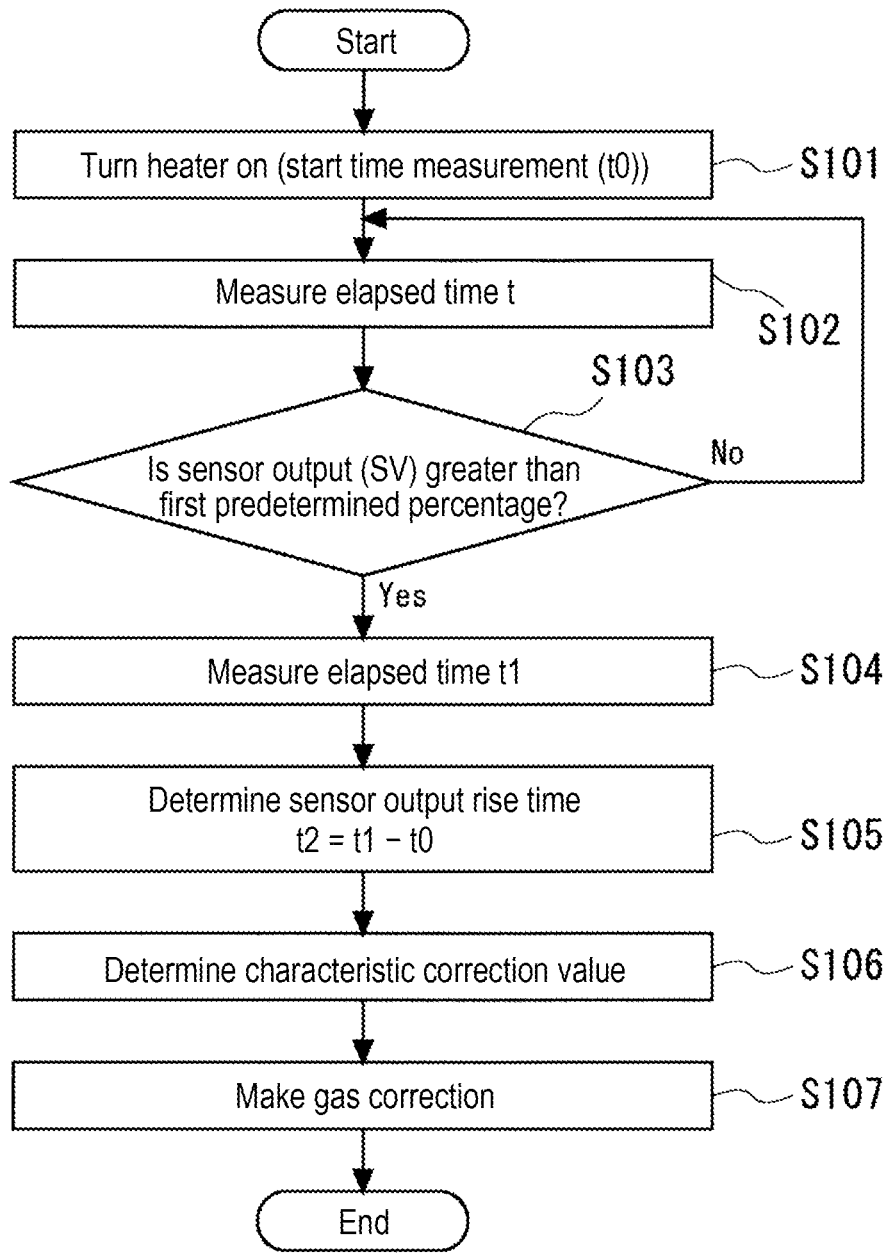
FIG. 11 is a flowchart of flow rate measurement processing according to the first embodiment of the present invention.

FIG. 11 is a processing flowchart of an example of flow rate measurement processing in the flow rate measuring device 1. This processing is executed in response to a command sent from the CPU (not shown) contained on the circuit board 5 of the flow rate measuring device 1 to the flow rate detector 11, the physical property value detector 12, and the controller 13. When this processing is executed, first, time measurement is started in step S101 upon turning the heater 123 of the physical property value detector 12 on. In S102, a transient time (t) is measured with the start of application of a current to drive the heater 123 set as a time (t0). When S102 exits, the processing proceeds to S103.

In S103, a determination is made as to whether a detection value (SV) of the temperature detector 121 or the like of the physical property value detector 12 becomes greater than a first predetermined percentage. Herein, the first predetermined percentage is a predetermined threshold for use in specifying the rise time normalized by a thermal equilibrium value of the fluid. As such a first predetermined percentage, for example, a value corresponding to approximately 95% with the thermal equilibrium value of the fluid whose flow rate is to be measured set as 100% is exemplified.

The process In S103, an output signal of the temperature detector 121 or the like of the physical property value detector 12 is transmitted to the characteristic value calculator 132 of the controller 13, so that the sensor output (SV) is detected by the characteristic value calculator 132. Then, when the SV thus detected becomes greater than the first predetermined percentage ("Yes" in S103), the processing proceeds to S104, and otherwise ("No" in S103), the processing proceeds to S102.

In S104, the transient time (t1) is measured. When the processing in S104 is completed, the processing proceeds to S105. In S105, a sensor output rise time is determined. More specifically, the sensor output rise time (t2) related to the fluid whose flow rate is to be measured is determined based on a difference between the time (t1) measured as the transient time and the time (t0) at which the time measurement is started. When the processing of S105 is completed, the processing proceeds to S106.

In S106, a characteristic correction value of the fluid whose flow rate is to be measured is determined using a correction coefficient for the sensor rise time and the thermal conductivity (W/m·K). More specifically, the flow rate calculator 133 accesses the correction table 141 stored in advance in the storage 14 on the circuit board 5 to obtain the characteristic correction value corresponding to the sensor rise time (t2). When the processing of S106 completed, the processing proceeds to S107. In S107, a gas correction based on the output from the characteristic value calculator 132 reflecting the characteristic correction value is further made in the flow rate calculator 132 as necessary, and the final volume flow rate (l/min) of the fluid is output. When the processing of S107 is completed, this routine is brought to a temporary end.

As described above, according to the embodiment, the physical property characteristic of the fluid is corrected based on the relationship between the sensor output rise time at which the normalized detection value (SV) of the temperature detector 121 or the like output from the physical property value detector 12 becomes equal to the first predetermined percentage and the thermal conductivity (W/m·K), and the volume flow rate (L/min) is output. This makes it possible to determine the difference in physical properties of a fluid similar in composition or type using the sensor rise time indicating the transient response characteristic, and it is thus possible to measure the flow rate with higher accuracy without being affected by the physical properties of the fluid. This allows the correction content in the flow rate calculator 133 to be further simplified and allows a reduction in calculation load on the controller 13.

Second Embodiment

Figure 12:
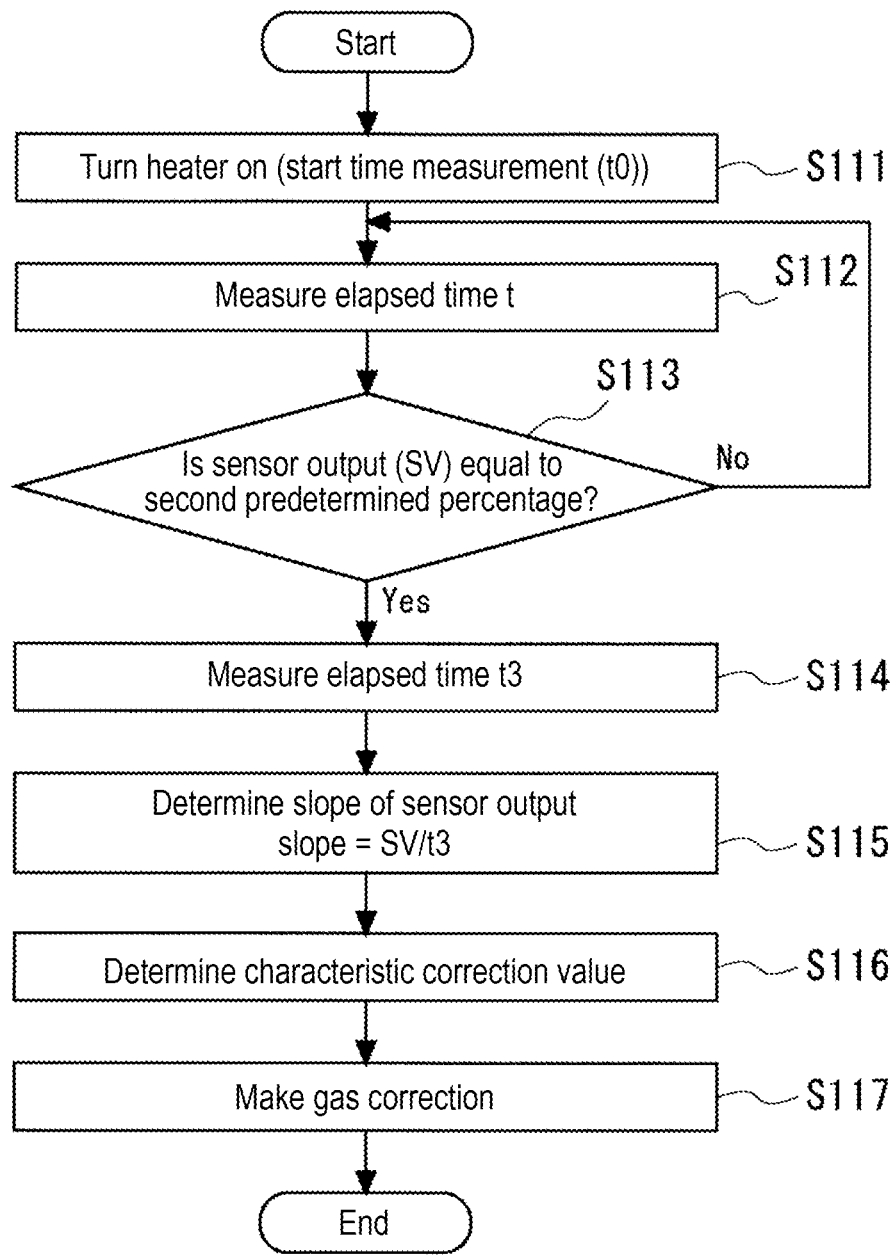
FIG. 12 is a flowchart of flow rate measurement processing according to a second embodiment of the present invention.
Figure 13:
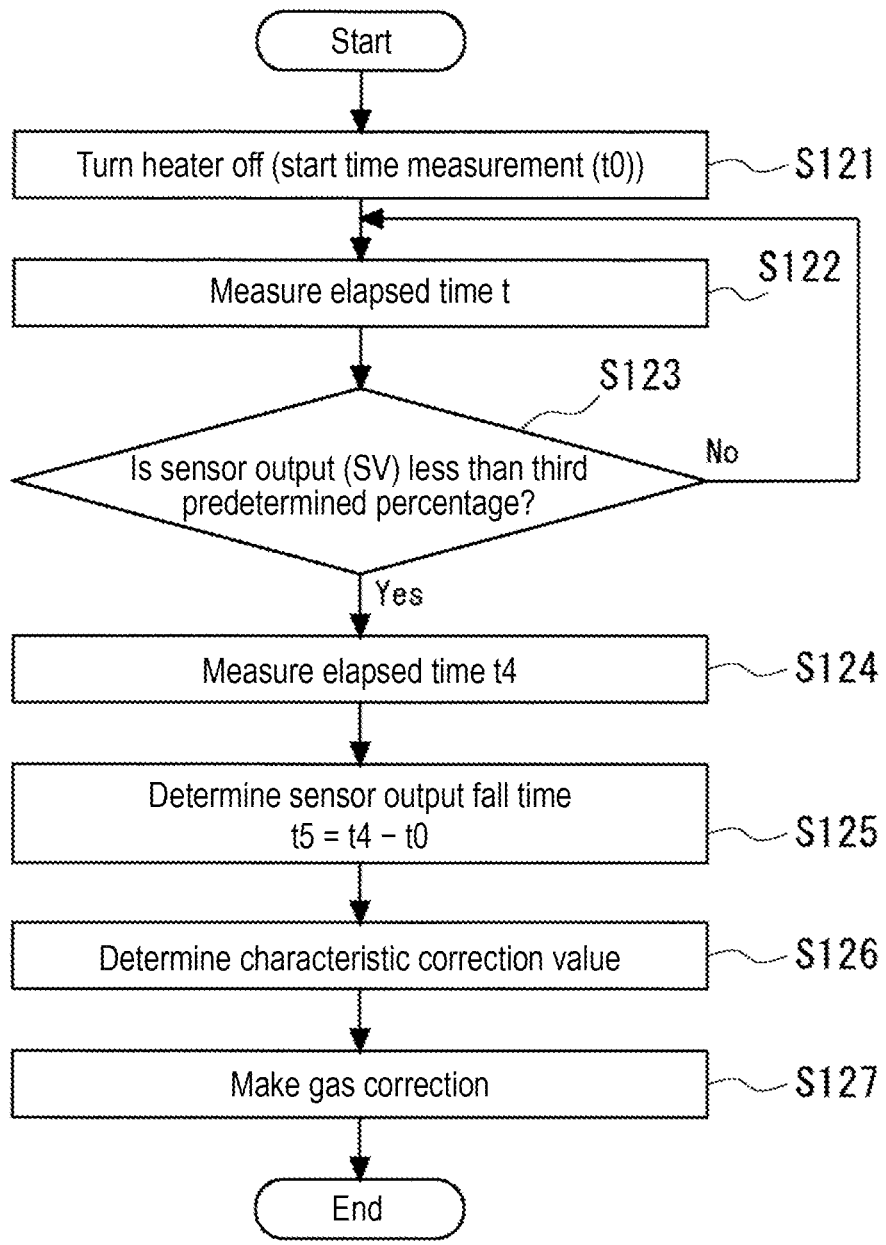
FIG. 13 is a flowchart of flow rate measurement processing according to a third embodiment of the present invention.
Figure 14:
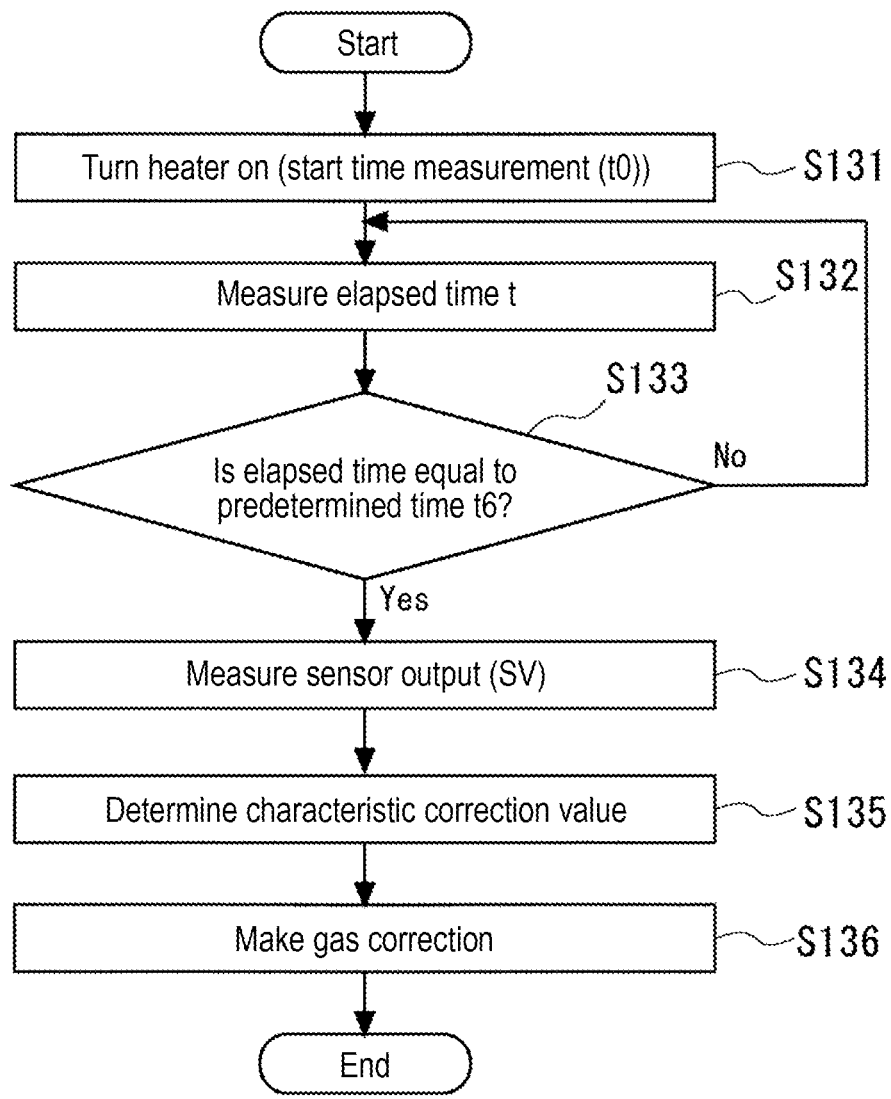
FIG. 14 is a flowchart of flow rate measurement processing according to a fourth embodiment of the present invention.

Next, a description will be given as a second embodiment of an example where a characteristic correction based on the slope of the change in the sensor output rise is enabled. FIG. 12 is a processing flowchart of another example of the flow rate measurement processing in the flow rate measuring device 1. Note that the following processing shown in FIGS. 12 to 14 is executed in the same manner as in the first embodiment.

First, in step S111, the time measurement is started upon turning the heater 123 of the physical property value detector 12 on, and in step S112, the transient time (t) is measured with the start of application of the current to drive the heater 123 set as the time (t0). In S113, a determination is made as to whether the detection value (SV) of the temperature detector or the like of the physical property value detector 12 becomes equal to a second predetermined percentage. The second predetermined percentage is a predetermined threshold for use in obtaining the slope of the change in rise normalized by the thermal equilibrium value of the fluid. As the second predetermined percentage, for example, a value corresponding to approximately 90% with the thermal equilibrium value of the fluid set as 100% is given. Note that the value set as the second predetermined percentage can be selected from, for example, values in a range where the percentage of the change in rise per unit time is approximated within an error range.

In the processing of S113, output signals of the temperature detector 121, 122 of the physical property value detector 12 are transmitted to the characteristic value calculator 132 of the controller 13, so that the sensor output (SV) is detected by the characteristic value calculator 132. Then, when the sensor output SV thus detected becomes equal to the second predetermined percentage ("Yes" in S113), the processing proceeds to S114, and otherwise ("No" in S113), the processing proceeds to S112.

In S114, the transient time (t3) is measured. In S115, the slope of the change in the sensor output is determined. More specifically, the slope of the change in the sensor output is determined based on a value obtained by dividing the sensor output (SV) by the transient time (t3). In S116, a characteristic correction value of the fluid whose flow rate is to be measured is determined using a correction coefficient for the slope of the change in the sensor output (SV/t3) and the thermal conductivity (W/m·K). In S117, a gas correction based on the output from the characteristic value calculator 132 reflecting the correction value obtained based on the slope of the change in the sensor output is made, and the final volume flow rate (l/min) of the fluid is output.

As described above, according to the second embodiment, the physical property characteristic of the fluid is corrected based on the relationship between the slope of the change in the sensor output at which the normalized detection value (SV) of the temperature detector 121 or the like becomes equal to the second predetermined percentage and the thermal conductivity (W/m·K), and the volume flow rate (L/min) is output. This makes it possible to determine the difference in physical properties of a fluid similar in composition or type using the slope of the change in the sensor output. Even in a form using such a transient response characteristic, it is possible to measure the flow rate with higher accuracy without being affected by the physical properties of the fluid.

Third Embodiment

Next, a description will be given as a third embodiment of an example where a characteristic correction based on a sensor output fall time is enabled. FIG. 13 is a processing flowchart of yet another example of the flow rate measurement processing in the flow rate measuring device 1. First, in step S121, the time measurement is started upon turning the heater 123 of the physical property value detector 12 off, and in step S122, the transient time (t) is measured with the start of application of the current to drive the heater 123 set as the time (t0). In S123, a determination is made as to whether a detection value (SV) of the temperature detector 121 or the like of the physical property value detector 12 becomes less than a third predetermined percentage. The third predetermined percentage is a predetermined threshold for use in specifying the rise time normalized by the thermal equilibrium value of the fluid. As the third predetermined percentage, for example, a value corresponding to approximately 95% with the thermal equilibrium value of the fluid set as 100% is exemplified.

In the pro of S123, an output signal of the temperature detector 121 or the like of the physical property value detector 12 is transmitted to the characteristic value calculator 132 of the controller 13, so that the sensor output (SV) is detected by the characteristic value calculator 132. Then, when the sensor output SV thus detected becomes greater than the third predetermined percentage ("Yes" in S123), the processing proceeds to S124, and otherwise ("No" in S123), the processing proceeds to S122.

In S124, a transient time (t4) is measured. In S125, the sensor output fall time is determined. More specifically, the sensor output fall time (t5) is determined based on a difference between the time (t4) measured as the transient time and the time (t0) at which the time measurement is started. In S126, a characteristic correction value of the fluid whose flow rate is to be measured is determined using a correction coefficient for the sensor fall time and the thermal conductivity (W/m·K). In S127, a gas correction based on the output from the characteristic value calculator 132 reflecting the correction value obtained based on the sensor output fall time is made, and the final volume flow rate (l/min) of the fluid is output.

As described above, according to the third embodiment, the physical property characteristic of the fluid is corrected based on the relationship between the sensor output fall time at which the normalized detection value (SV) of the temperature detector 121 or the like becomes less than the third predetermined percentage and the thermal conductivity (W/m·K), and the volume flow rate (L/min) is output. This makes it possible to determine the difference in physical properties of a fluid similar in composition or type using the sensor output fall time indicating the transient response characteristic. Even in such a form, it is possible to measure the flow rate with higher accuracy without being affected by the physical properties of the fluid.

Fourth Embodiment

Next, a description will be given as a fourth embodiment of an example where a characteristic correction based on the sensor output (SV) appearing over time is enabled. FIG. 14 is a processing flowchart of yet another example of the flow rate measurement processing in the flow rate measuring device 1. First, in step S131, the time measurement is started upon turning the heater 123 of the physical property value detector 12 on, and in step S132, the transient time (t) is measured with the stop of application of the current to drive the heater 123 set as the time (t0). In S133, a determination is made as to whether the transient time under measurement becomes equal to a predetermined time (t6). In the processing of S133, when the transient time under measurement becomes equal to the predetermined time (t6) ("Yes" in S133), the processing proceeds to S134, and otherwise ("No" in S133), the processing proceeds to S132.

In S134, an output signal of the temperature detector 121 or the like of the physical property value detector 12 is transmitted to the characteristic value calculator 132 of the controller 13, and the sensor output (SV) at the predetermined time (t6) is determined. In S135, a characteristic correction value of the fluid whose flow rate is to be measured is determined using the correction coefficient for the sensor output (SV) thus determined and the thermal conductivity (W/m·K). In S136, a gas correction based on the output from the characteristic value calculator 132 reflecting the correction value obtained based on the sensor output (SV) is made, and the final volume flow rate (l/min) of the fluid is output.

As described above, according to the fourth embodiment, the physical property characteristic of the fluid is corrected based on the relationship between the normalized detection value (SV) of the temperature detector 121 or the like and the thermal conductivity (W/m·K) after the lapse of the predetermined time, and the volume flow rate (L/min) is output. This makes it possible to determine the difference in physical properties of a fluid similar in composition or type using the sensor output after the lapse of the predetermined time indicating the transient response characteristic. Even in such a form, it is possible to measure the flow rate with higher accuracy without being affected by the physical properties of the fluid.

Fifth Embodiment

Next, a description will be given as a fifth embodiment of a gas meter into which the flow rate measuring device according to the first to fourth embodiments is incorporated and a flow rate measuring device unit. The embodiment is an example where the flow rate measuring device 1 according to the first embodiment is incorporated into a gas meter configured to measure the amount of gas usage. FIG. 15 is a block diagram of an example of a functional configuration of the gas meter 150 into which the flow rate measuring device 1 is incorporated. The gas meter 150 includes, in addition to the flow rate measuring device 1, the display 151, the power supply unit 152, the operation unit 153, the vibration detector 154, the cutoff unit 155, the gas meter controller 156 serving as an integrated controller, the gas meter storage 157, and the gas meter communication unit 158. Note that the components other than the operation unit 153 are housed in a casing 150b.

Herein, the display 151 is a display configured to display the amount of gas usage based on the flow rate measured and output by the flow rate measuring device 1 (either a heat flow rate (J/min) or a volume flow rate (l/min), or both), the date, the presence or absence of cutting-off processing (to be described later), and the like, and the display 151 may be a liquid crystal display or the like. The power supply unit 152 is configured to supply power to the flow rate measuring device 1 and the other components of the gas meter 150, and the power supply unit 152 may be made up of a battery such as an alkaline battery. The operation unit 153 is provided outside the gas meter 150 and is operated by a gas contractor, a meter reader, or the like. For example, operations such as resetting of the gas meter 150, time adjustment, switching of the flow rate (either the heat flow rate or the volume flow rate, or both) to be displayed and output, and termination of a cutoff state to be described later.

The vibration detector 154 includes, for example, an accelerometer (not shown) and the like and detects vibrations of the gas meter 150. The cutoff unit 155 includes an actuator such as a solenoid and a valve that blocks the main channel section 2, and determines that an earthquake has occurred when the vibration detector 154 detects vibrations equal to or greater than a threshold and cuts off gas flowing through the main channel section 2. The gas meter controller 156 is electrically coupled with the flow rate measuring device 1, the display 151, the power supply unit 152, the operation unit 153, the vibration detector 154, the cutoff unit 155, the gas meter storage 157, and the gas meter communication unit 158 and controls each of the components. For example, the gas meter controller 156 receives input information from the operation unit 153 and transmits a command corresponding to the input information to each of the components. Further, when the vibration detector 154 detects an acceleration signal equal to or greater than the threshold, a cutoff signal is transmitted to the cutoff unit 155. The gas meter storage 157 is configured to store outputs from the flow rate measuring device 1 and the vibration detector 154 in time series over a predetermined period and may be made up of a memory element such as SRAM or DRAM. The gas meter communication unit 158 is capable of transmitting each piece of information processed by the gas meter controller 156 to the outside by radio or wire and receiving a command or a configuration value from the outside to pass the command or the configuration value to the gas meter controller 156. Alternatively, the gas meter communication unit 158 may communicate with the communication unit 15 of the flow rate measuring device 1 to receive information processed by the controller 13 of the flow rate measuring device 1 or transmit the control signal or the configuration value for the flow rate measuring device 1.

Note that the gas meter 150 may have a structure where, of the components of the gas meter 150, for example, the flow rate measuring device 1, the display 151, the power supply unit 152, the vibration detector 154, the gas meter controller 156, the gas meter storage 157, and the gas meter communication unit 158 are integrated into a single unit, the operation unit 153 and the cutoff unit 155 are electrically coupled with this flow rate measuring device unit 150*a*, and the flow rate measuring device unit 150*a*, the operation unit 153, and the cutoff unit 155 are housed in the casing 150*b*. This allows the gas meter 150 to be manufactured more efficiently.

Note that, the components belonging to the gas meter 150 and the flow rate measuring device unit 150*a* given in the embodiment are merely examples and may be changed in accordance with the capability of the gas meter 150 and manufacturing conditions. Further, the configuration of the flow rate measuring device according to the present invention are not limited to the configurations given in the above-described embodiments. The configurations given in the above-described embodiments may be combined to an allowable degree without departing from the problem or technical idea of the present invention.

Further, in the above-described embodiments, the correction example using the transient response of the detection values of the temperature detectors 121, 122 of the physical property value detector 12 in the flow rate measuring device 1 has been described, but even when the detection value from the flow rate detector 11 is used, substantially the same contents are satisfied. That is, the flow rate measuring device 1 includes the flow rate detector 11 but without the physical property value detector 12. This allows the characteristic value calculator 132 of the controller 13 to use the transient responses of the detection values of the temperature detectors 111, 112 of the flow rate detector 11 instead of the temperature detectors 121, 122 of the physical property value detector 12. For example, when the correction processing is executed, the flow rate measuring device 1 notifies a high-level controller such as a gas meter of the execution of the correction processing using the communication unit 15 to block the channel of the flow rate detector 11. The blocking is made, for example, using a valve that causes the cutoff unit 155 to block the main channel section 2. When the channel of the flow rate detector 11 is blocked, the fluid flowing through the channel is brought into a calm state, so that heat distributed by the heater 113 has a state shown in FIG. 5A. Accordingly, the flow rate measuring device 1 may make the characteristic correction based on the transient response characteristic described with reference to FIGS. 11 to 14 from the detection values of the temperature detectors 111, 112 of the flow rate detector 11.

Note that, in order to allow a comparison between the configuration requirement of the present invention and the configuration of each embodiment, the configuration requirement of the present invention will be described with the reference numerals used in the drawings.

<First Invention>

A flow rate measuring device (1) that detects a flow rate of a fluid flowing through a main channel (2) includes a heater (113) configured to heat a fluid, a temperature detector (111, 112) configured to detect a temperature of the fluid, and a flow rate correcting unit (133) configured to correct a flow rate of the fluid flowing through a main channel based on a change tendency of the detected value by the temperature detector over time.

<Second Invention>

In the flow rate measuring device according to the First Invention, the flow rate correcting unit (133) includes a correcting unit (133) configured to correct the flow rate of the fluid flowing through the main channel based on a first transient period from start of application of heat to the fluid until the detection value becomes greater than a first predetermined percentage of a thermal equilibrium temperature of the fluid heated near the temperature detector.

<Third Invention>

In the flow rate measuring device according to the First Invention, the flow rate correcting unit (133) includes a correcting unit (133) configured to correct the flow rate of the fluid flowing through the main channel based on a slope of a change over time of the detection value from start of application of heat to the fluid until the detection value becomes equal to a second predetermined percentage of the thermal equilibrium temperature of the fluid heated near the temperature detector.

<Fourth Invention>

In the flow rate measuring device according to the Second or Third Invention, the flow rate correcting unit (133) includes a correcting unit (133) configured to correct the flow rate of the fluid flowing through the main channel based on a second transient period from stop of application of heat to the fluid until the detection value equal to the thermal equilibrium temperature becomes less than a third predetermined percentage of the thermal equilibrium temperature.

<Fifth Invention>

In the flow rate measuring device according to the First Invention, the flow rate correcting unit (133) includes a correcting unit (133) configured to correct the flow rate of the fluid flowing through the main channel based on the detection value detected when a third transient period elapses from start of application of heat to the fluid.

<Sixth Invention>

In the flow rate measuring device according to any one of the First Invention to the Fifth Invention, the flow rate correcting unit (133) obtains, when the fluid is stopped flowing, information indicating the tendency of the detection value to change over time for use in correcting the flow rate of the fluid flowing through the main channel.

<Seventh Invention>

In the flow rate measuring device according to any one of the First Invention to the Sixth Invention, the heater and the temperature detector are arranged in a direction intersecting a flow direction of the fluid.

<Eighth Invention>

In the flow rate measuring device according to the Seventh Invention, a plurality of the temperature detectors are provided, and at least two of the plurality of temperature detectors are arranged to cause the heater to be interposed between the at least two temperature detectors.

<Ninth Invention>

In the flow rate measuring device according to the Seventh or Eighth Invention, the temperature detector includes a cold junction and a hot junction, and the temperature detector is disposed to have the cold junction located upstream in the flow direction of the fluid and the hot junction located downstream in the flow direction of the fluid.

<Tenth Invention>

A flow rate measuring unit (150*a*) includes a flow rate measuring device (1) according to any one of the First Invention to the Ninth Invention, a display (151) configured to display a flow rate corrected by the flow rate correcting unit, and an integrated controller (156) configured to control the flow rate measuring device and the display.

<Eleventh Invention>

A gas meter (150) includes a flow rate measuring device (1) according to any one of the First Invention to the Ninth Invention, a display (151) configured to display a flow rate measured by the flow rate measuring device, an integrated controller (156) configured to control the flow rate measuring device and the display, a power supply unit (152) configured to supply power to the flow rate measuring device (1), the display (151), and the integrated controller (156), a casing (150*b*) configured to house the flow rate measuring device (1), the display (151), and the integrated controller (156), and an operation unit (153) configured to allow operation settings of the flow rate measuring device to be made from outside of the casing (150*b*).

DESCRIPTION OF SYMBOLS

1 flow rate measuring device
11 flow rate detector
111 temperature detector
112 temperature detector
113 heater
12 physical property value detector
121 temperature detector
122 temperature detector
123 heater
13 controller
131 detection value obtaining unit
132 characteristic value calculator
133 flow rate calculator
14 storage
141 correction table
15 communication unit
2 main channel section
21 orifice
3 sub-channel section
32 physical property value detection channel
33 flow rate detection channel
34 inflow channel
35 outflow channel
4 gasket
5 circuit board
6 cover
100 sensor element
101 micro-heater
102 thermopile
103 insulation thin film
104 silicon base
105 cavity
150 gas meter
150*a* flow rate measuring device unit

The invention claimed is:

1. A flow rate measuring device that detects a flow rate of a fluid flowing through a main channel, the flow rate measuring device comprising:
   a heater configured to heat a fluid;
   a temperature detector configured to detect a temperature of the fluid; and
   a flow rate correcting unit configured to correct a flow rate of the fluid flowing through the main channel based on a change tendency of the detected value of the temperature, detected by the temperature detector, over time,
   wherein the flow rate correcting unit comprises, as a part of the flow rate correcting unit, a correcting unit configured to correct the flow rate of the fluid flowing through the main channel based on a first transient period from a start of application of heat to the fluid until the detected value becomes greater than a first predetermined percentage of a thermal equilibrium temperature of the fluid heated near the temperature detector, or based on a slope of a change over time of the detected value from a start of application of heat to the fluid until the detected value becomes equal to a second predetermined percentage of a thermal equilibrium temperature of the fluid heated near the temperature detector.

2. The flow rate measuring device according to claim 1, wherein the flow rate correcting unit comprises, as a part of the flow rate correcting unit, a second correcting unit configured to correct the flow rate of the fluid flowing through the main channel based on a second transient period from a stop of application of heat to the fluid until the detected value equal to the thermal equilibrium temperature becomes less than a third predetermined percentage of the thermal equilibrium temperature.

3. The flow rate measuring device according to claim 1, wherein the flow rate correcting unit comprises, as a part of the flow rate correcting unit, a second correcting unit configured to correct the flow rate of the fluid flowing through the main channel based on the detected value detected when a predetermined period elapses from a start of application of heat to the fluid.

4. The flow rate measuring device according to claim 1, wherein
   the flow rate correcting unit obtains, when the fluid is stopped flowing, information indicating the change tendency of the detected value of the temperature over time for use in correcting the flow rate of the fluid flowing through the main channel.

5. The flow rate measuring device according to claim 1, wherein
   the heater and the temperature detector are arranged in a direction intersecting a flow direction of the fluid.

6. The flow rate measuring device according to claim 5, wherein
   a plurality of the temperature detectors are provided, and two of the plurality of temperature detectors are arranged such that the heater is interposed between the at least two temperature detectors.

7. The flow rate measuring device according to claim 5, wherein
   the temperature detector comprises a cold junction and a hot junction, and the temperature detector is disposed to have the cold junction located upstream in the flow direction of the fluid and the hot junction located downstream in the flow direction of the fluid.

8. A flow rate measuring unit comprising:
   the flow rate measuring device according to claim 1;
   a display configured to display the flow rate corrected by the flow rate correcting unit; and
   an integrated controller configured to control the flow rate measuring device and the display.

9. A gas meter comprising:
   the flow rate measuring device according to claim 1;
   a display configured to display the flow rate measured by the flow rate measuring device;
   an integrated controller configured to control the flow rate measuring device and the display;
   a power supply unit configured to supply power to the flow rate measuring device, the display, and the integrated controller;
   a casing configured to house the flow rate measuring device, the display, and the integrated controller; and an operation unit configured to allow operation settings of the flow rate measuring device to be made from outside of the casing.

* * * * *

UNITED STATES PATENT AND TRADEMARK OFFICE
CERTIFICATE OF CORRECTION

| | | |
|---|---|---|
| PATENT NO. | : 12,061,106 B2 | Page 1 of 1 |
| APPLICATION NO. | : 17/434979 | |
| DATED | : August 13, 2024 | |
| INVENTOR(S) | : Katsuyuki Yamamoto | |

It is certified that error appears in the above-identified patent and that said Letters Patent is hereby corrected as shown below:

In the Claims

In Column 22, Line 43, the words "at least" should be deleted.

Signed and Sealed this
Fourteenth Day of January, 2025

Derrick Brent
*Acting Director of the United States Patent and Trademark Office*